(12) United States Patent
Okubo et al.

(10) Patent No.: US 9,278,492 B2
(45) Date of Patent: Mar. 8, 2016

(54) METHOD FOR PRODUCING OPTICAL LENS

(75) Inventors: Shigeki Okubo, Shinjuku-ku (JP);
Kazuhito Yamanouchi, Shinjuku-ku (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/001,291

(22) PCT Filed: Feb. 28, 2012

(86) PCT No.: PCT/JP2012/054963
§ 371 (c)(1),
(2), (4) Date: Nov. 1, 2013

(87) PCT Pub. No.: WO2012/118089
PCT Pub. Date: Sep. 7, 2012

(65) Prior Publication Data
US 2014/0099439 A1    Apr. 10, 2014

(30) Foreign Application Priority Data

Feb. 28, 2011  (JP) ................................. 2011-041427
Feb. 28, 2012  (JP) ................................. 2012-041679

(51) Int. Cl.
*B05D 5/06*      (2006.01)
*B29D 11/00*    (2006.01)
(Continued)

(52) U.S. Cl.
CPC ............ *B29D 11/00865* (2013.01); *B05D 5/06* (2013.01); *B29D 11/00317* (2013.01); *B29D 11/00923* (2013.01); *G02B 1/11* (2013.01); *G02B 3/00* (2013.01); *G02C 7/021* (2013.01)

(58) Field of Classification Search
CPC ............... B05D 5/06; B29D 11/00865; B29D 11/00317; B29D 11/00894–11/00923; G02B 1/11; G02B 3/00–3/14; G02B 3/0075

USPC .......................................... 427/162, 164, 165
See application file for complete search history.

(56) References Cited

U.S. PATENT DOCUMENTS 4,619,504 A * 10/1986 Daniels et al. ........... 351/159.62
6,736,863 B2 * 5/2004 Inagaki et al. ................. 8/506
(Continued)

FOREIGN PATENT DOCUMENTS

| JP | A 2002-258002 | 9/2002 |
| JP | A 2004-321928 | 11/2004 |
| JP | A 2006-138887 | 6/2006 |
| JP | A 2006-178160 | 7/2006 |

(Continued)

OTHER PUBLICATIONS

Apr. 24, 2012 Search Report issued in International Patent Application No. PCT/JP2012/054963 (with translation).
(Continued)

*Primary Examiner* — Elizabeth Burkhart
(74) *Attorney, Agent, or Firm* — Oliff PLC

(57) ABSTRACT

A method for producing an optical lens includes: forming a mark outside a lens region set in a lens substrate, the mark being adapted to perform position alignment; pattern-forming a masking layer above one principal surface of the lens substrate while controlling formation position of the masking layer with the mark as a reference, the masking layer having an aperture at a predetermined position in the lens region; performing a selective process with respect to a surface exposed from the bottom of the aperture of the masking layer by performing a process from above the masking layer; and removing the masking layer from above the lens substrate to form a processed pattern by the selective process on the side of the one principal surface of the lens substrate.

10 Claims, 15 Drawing Sheets

(51) Int. Cl.
*G02B 3/00* (2006.01)
*G02C 7/02* (2006.01)
*G02B 1/11* (2015.01)

(56) References Cited

U.S. PATENT DOCUMENTS

2008/0051012 A1* 2/2008 Akiyama et al. ............... 451/42
2008/0075837 A1* 3/2008 Bower ........................... 427/58
2008/0151182 A1* 6/2008 Hsu .............................. 351/163

FOREIGN PATENT DOCUMENTS

| | | |
|---|---|---|
| JP | A 2007-41569 | 2/2007 |
| JP | A 2008-55253 | 3/2008 |
| WO | WO 00/67051 | 11/2000 |

OTHER PUBLICATIONS

Sep. 3, 2013 International Preliminary Report on Patentability issued in International Patent Application No. PCT/JP2012/054963 (with translation).

* cited by examiner a—a'

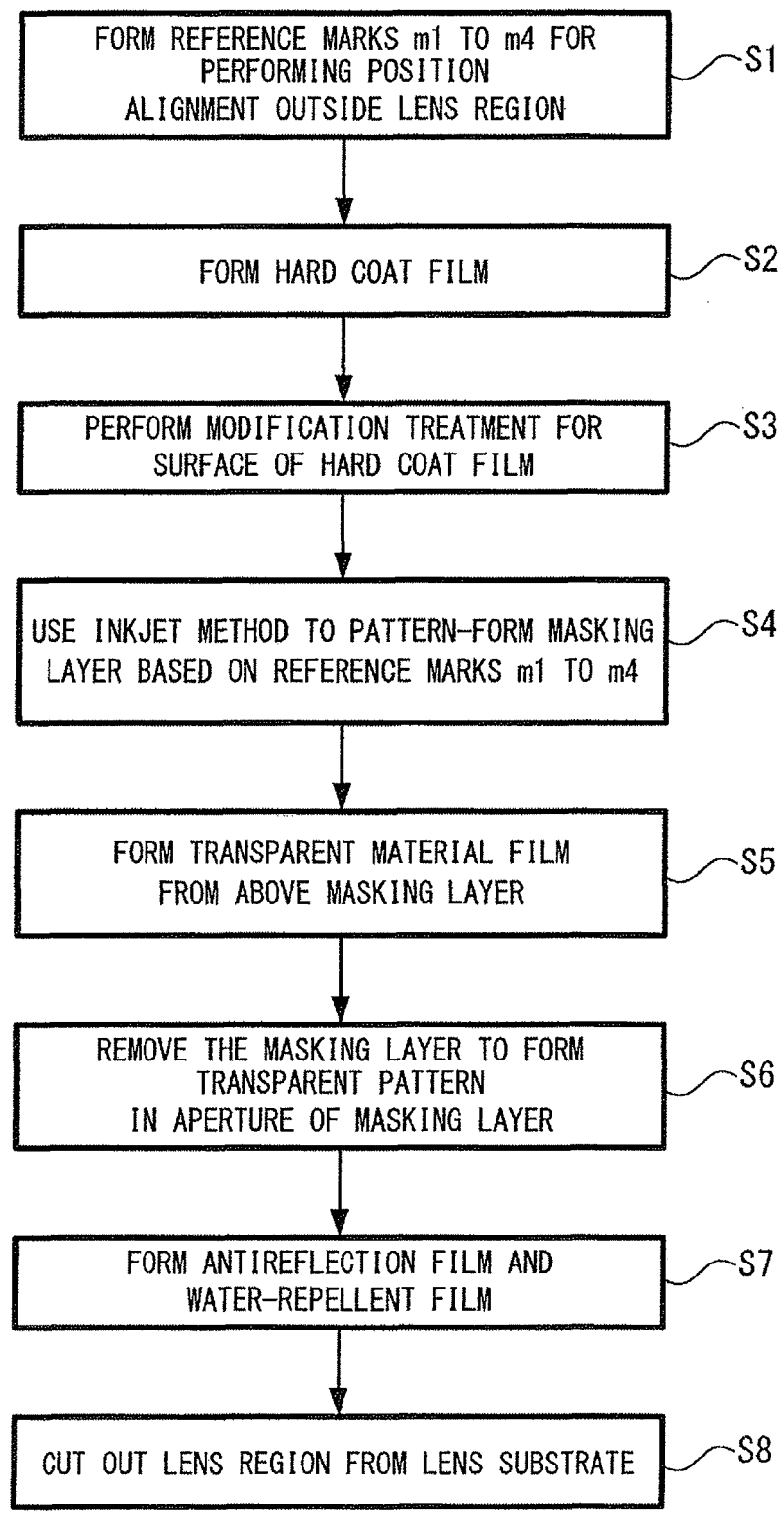

a—a' a—a' a–a' a—a' a—a' a—a'

METHOD FOR PRODUCING OPTICAL LENS

TECHNICAL FIELD

The present invention relates to a method for producing an optical lens, more particularly to a method for producing an optical lens which includes a step of forming a pattern on a lens surface.

BACKGROUND ART

A spectacle lens has various films coated on a lens substrate thereof. Examples of the various films include a hard coat film, an antireflection film, a water-repellent film and the like, wherein the hard coat film is adapted to prevent the lens substrate from being scratched, the antireflection film is adapted to prevent light from being reflected by lens surface, and the water-repellent film is adapted to prevent water spotting on the lens. Apart from the aforesaid configuration, another configuration is proposed in which, as a film for reducing the amount of the light incident on the eye of the wearer of the spectacles, a semi-transmissive thin film is coated on the entire surface of the lens in a dot-like manner, and an antireflection film is coated on the semi-transmissive thin film (see Patent document 1, for example).

In recent years, a plastic lens light in weight and excellent in dyeing affinity is favorably used as a high-fashion spectacle lens; and further, in order to improve the designability, a configuration is proposed in which a pattern is formed on the lens by applying a pigmented coating on the lens using an inkjet method.

PRIOR ART DOCUMENTS

Patent Documents

Patent document 1: Japanese Unexamined Patent Application Publication No. 2008-55253
Patent document 2: WO00-67051 (particularly page 7)

DISCLOSURE OF THE INVENTION

Problems to be Solved by the Invention

However, in the case where a pattern is formed on the lens to improve the designability, for example, if the aforesaid method is employed in which a pigmented coating is simply coated on the lens using an inkjet method, it is possible to control the position where the pattern is to be formed, however the material constituting the pattern is limited to materials applicable to the inkjet method. Thus, the inkjet method can not be employed to form a pattern using a material, such as an inorganic material, unfit for forming ink, and therefore such a method lacks versatility.

Therefore, it is an object of the present invention to provide a method for producing an optical lens in which a processed pattern can be accurately formed on a lens surface at a predetermined position of the lens substrate without limiting the material.

Means for Solving the Problems

To achieve the aforesaid object, a method for producing an optical lens according to an aspect of the present invention includes the following steps: first, forming a mark outside a lens region set in a lens substrate, wherein the mark is adapted to perform position alignment; then, pattern-forming a masking layer above one principal surface of the lens substrate while controlling formation position of the masking layer with the mark as a reference, wherein the masking layer has an aperture at a predetermined position in the lens region; thereafter, performing a selective process with respect to a surface exposed from the bottom of the aperture of the masking layer by performing a process from above the masking layer; and then, removing the masking layer from above the lens substrate to form a processed pattern by the selective process on the side of the one principal surface of the lens substrate.

With such a producing method, by performing the process from above the pattern-formed the masking layer, the processed pattern is formed on the surface exposed from the bottom of the aperture of the masking layer. Thus, by performing the pattern-forming of the masking layer using a method accurate in position and shape (such as an inkjet method, for example), the processing method for forming the processed pattern may be any one selected from a wide range of processing methods, instead of being limited to a method accurate in position and shape, to obtain accurate processed pattern.

In the aforesaid producing method, in the step of performing the selective process, a process for forming a transparent material film is performed. In such a case, in the step of removing the masking layer, the transparent material film formed on the masking layer is removed along with the masking layer. Thus, a transparent pattern formed of the transparent material film, as the processed pattern, is formed only on the surface exposed from the bottom of the aperture of the masking layer. By performing such process, the transparent pattern can be accurately formed on the lens substrate.

In the aforesaid producing method, as another example of the step of performing the selective process, a dyeing process with respect to bottom of the aperture of the masking layer may be performed. In such a case, a dyeing pattern is formed as the processed pattern. By performing such a process, a dyeing pattern can be accurately formed at least in the surface layer of the lens substrate.

In the aforesaid producing method, it is preferred that a modification treatment with respect to the surface of a base of the masking layer is performed before the step of forming the masking layer by an inkjet method, wherein the modification treatment is adapted to ensure wettability of the base with respect to the ink constituting the masking layer. Thus, it is possible to form a masking layer, as a homogenous continuous film, in the inkjet method to be performed next; and in the case where a process is performed from above the masking layer, it is possible to accurately form a processed pattern only within the aperture of the masking layer.

Advantages of the Invention

With the aforesaid method for producing an optical lens, it is possible to accurately form a processed pattern at a predetermined position on the lens substrate using a treatment method with wide selection, without limiting the material.

BRIEF DESCRIPTION OF DRAWINGS

FIG. 2 is a flowchart showing a producing procedure of the optical lens of the first embodiment;

MODES FOR CARRYING OUT THE INVENTION

Figure 1A:
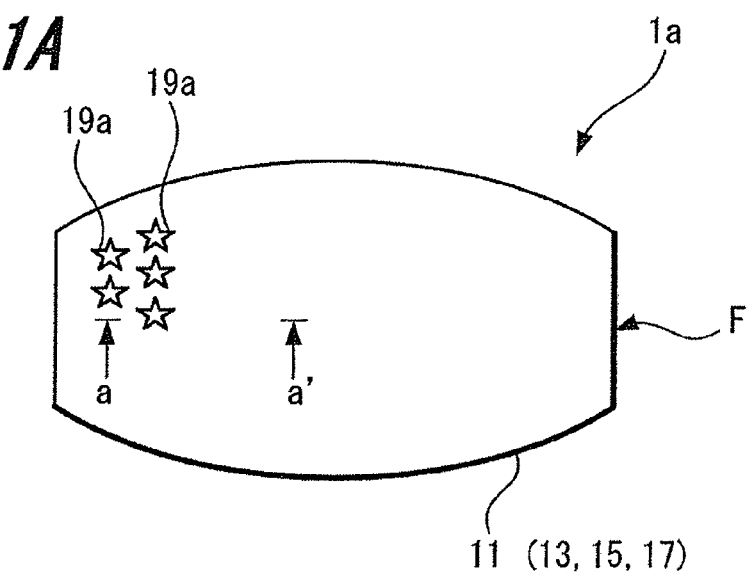
FIGS. 1A and 1B are respectively a plan view and a cross-sectional view showing the configuration of an optical lens produced by a method according to a first embodiment.

Embodiments of the present invention will be described in the following order based on the attached drawings.
1. First embodiment (an example in which an island-like transparent pattern is formed between an antireflection film and a lens substrate)
2. Second embodiment (an example in which a transparent pattern having an aperture is formed between the antireflection film and the lens substrate)
3. Third embodiment (an example in which an island-like transparent pattern is formed above the antireflection film).
4. Fourth embodiment (an example in which an island-like dyed pattern is formed on a surface layer of the lens substrate).
5. Fourth embodiment (an example in which a dyed pattern having an aperture is formed on the surface layer of the lens substrate).

Note that, in the aforesaid embodiments, the same components are denoted by the same reference numerals, and the explanation thereof will not be repeated.

1. First Embodiment

Configuration of Optical Lens According to First Embodiment

Figure 1B:
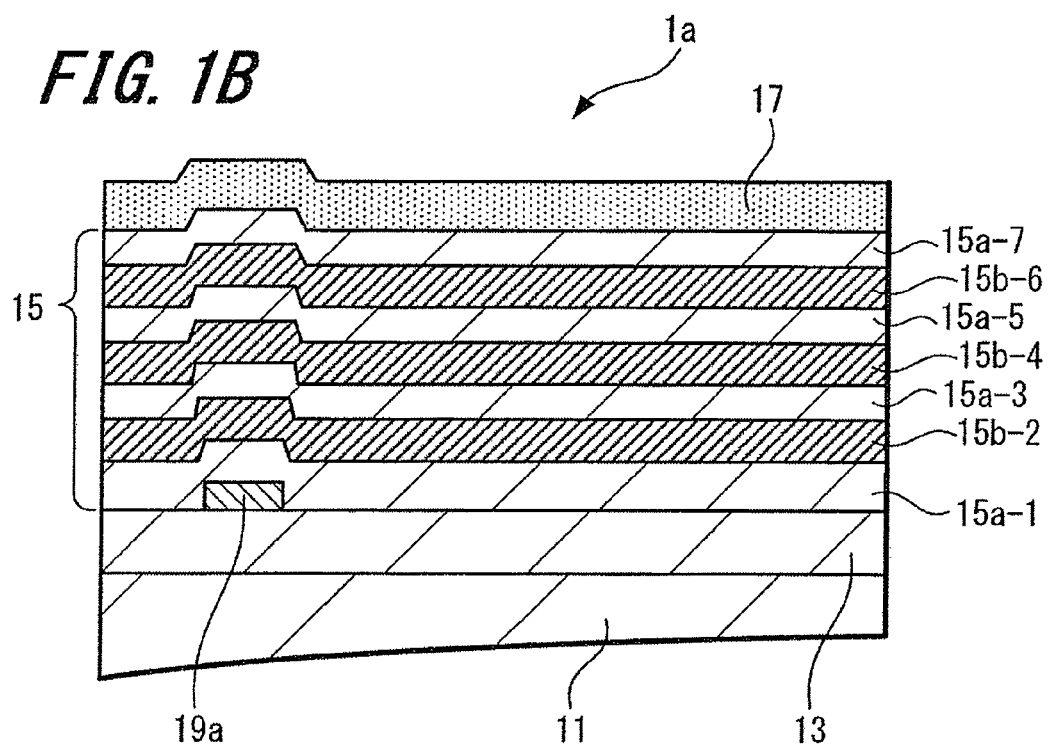

FIGS. 1A and 1B are views for explaining the configuration of an optical lens 1a according to a first embodiment, wherein FIG. 1A is a plan view, and FIG. 1B is a cross section taken along line a-a' of FIG. 1A. The optical lens 1a of the first embodiment shown in FIGS. 1A and 1B is favorable to be used as a spectacle lens, for example, and is configured as below.

To be specific, the optical lens 1a has a hard coat film 13, an antireflection film 15 and a water-repellent film 17 laminated, in this order, to one principal surface of a lens substrate 11 thereof. Particularly, one characteristic of the optical lens 1a of the first embodiment is that an island-like transparent pattern 19a, as a processed pattern, is provided between the hard coat film 13 and the antireflection film 15 formed on lens substrate 11. The detail configuration of the components constituting the optical lens 1a will be described below in the order from the lens substrate 11.

[Lens Substrate 11]

The lens substrate 11 is formed into a predetermined lens shape by using a plastic material commonly used for producing optical lenses. The refractive index of the plastic material is (nD) 1.50 to 1.74, for example. Examples of such plastic material include allyl diglycol carbonate, urethane resin, polycarbonate, thiourethane resin, and episulfide resin. Here, when the optical lens 1a is used to configure a pair of spectacles, the surface of the lens substrate 11 that forms the front side of the spectacles is defined as a "one principal surface"; and the aforesaid layers (i.e., the films from the hard coat film 13 to the water-repellent film 17, and the transparent pattern 19a) are laminated to the one principal surface.

[Hard Coat Film 13]

The hard coat film 13 is used as the base of the antireflection film 15, and is formed of a material containing an organosilicon compound, for example. The refractive index of the hard coat film 13 is close to the refractive index of the aforesaid plastic material. To be specific, the hard coat film 13 has a refractive index of about (nD) 1.49 to 1.70, and film configuration is selected according to the material of the lens substrate 11.

[Antireflection Film 15]

The antireflection film 15 has a multi-layer structure formed by laminating a plurality of material films one upon another wherein the plurality of material films each have different refractive index, and is adapted to prevent light reflection by interference. Examples of the antireflection film 15 include the one which has a multi-layer structure formed by alternately laminating a low refractive index film 15a and a high refractive index film 15b one upon another. The low refractive index film 15a is formed of, for example, silica dioxide ($SiO_2$) which has a refractive index of about 1.43 to 1.47. The high refractive index film 15b is formed of a material having a refractive index higher than the refractive index of the low refractive index film 15a, wherein such material is composed of, at a proper rate, a plurality of metal oxides such as niobium oxide ($Nb_2O_5$), tantalum oxide ($Ta_2O_5$), titanium oxide ($TiO_2$), zirconium oxide ($ZrO_2$), yttrium oxide ($Y_2O_3$), aluminum oxide ($Al_2O_3$) and the like.

In the antireflection film 15 formed of the low refractive index film 15a and the high refractive index film 15b, the number of the laminated layers is not particularly limited. As an example, the antireflection film 15 may be formed by laminating seven layers of refractive index films, which are a low refractive index film 15a-1, a high refractive index film 15b-2, ... a low refractive index film 15a-7, one upon another in this order from the side of the lens substrate 11. The film thickness of each low refractive index film 15a and each high refractive index film 15b is set according to each refractive index so that a predetermined phase difference is obtained.

As an example, the antireflection film 15 may have a film configuration in which the film thickness of the low refractive index film 15*a* and the film thickness of the high refractive index film 15*b* are set according to the refractive index thereof so that, in the order from the side of the lens substrate 11, the combined phase difference of three layers of "low refractive index film 15*a*-1/high refractive index film 15*b*-2/low refractive index film 15*a*-3" is [λ/4], the combined phase difference of three layers of "high refractive index film 15*b*-4/low refractive index film 15*a*-5/high refractive index film 15*b*-6" is [λ/2], and the phase difference of one layer of "low refractive index film 15*a*-7" is [λ/4].

[Water-Repellent Film 17]

The water-repellent film 17 is formed of, for example, an organosilicon compound having a fluorine-substituted alkyl group. The film thickness of the water-repellent film 17 is set so that antireflection function is exhibited in combination with the antireflection film 15.

[Transparent Pattern 19*a*]

The transparent pattern 19*a* is provided as an ornamental pattern, logo, character or the like, and is configured as an island-like pattern formed of a light transmissive material. The transparent pattern 19*a* used in the first embodiment needs to have transparency with respect to visible light, for example; and it is particularly preferred that the refractive index of the transparent pattern 19*a* is higher than the refractive indexes of the layers that sandwich the transparent pattern 19*a*. The film thickness of the transparent pattern 19*a* is suitably adjusted based on both the refractive index of the material constituting the transparent pattern 19*a* and the required visibility of the transparent pattern 19*a* when viewed from the side of the water-repellent film 17. Incidentally, the transparent pattern 19*a* may also be formed by laminating a plurality of different material layers one upon another.

The material used to form the transparent pattern 19*a* has a refractive index higher than both the refractive index of the hard coat film 13 and the refractive index of the low refractive index film 15*a*-1, which sandwich the transparent pattern 19*a* in between. The material identical to the material constituting the high refractive index film 15*b* of the antireflection film 15 is preferably used as the material of the transparent pattern 19*a*. In the case where such material is used to form the transparent pattern 19*a*, the film thickness of the transparent pattern 19*a* is about 10 nm. With such a configuration, it is possible to obtain a high visibility of the transparent pattern 19*a* when viewing the lens from the side of the water-repellent film 17. Incidentally, if it is purposely to obtain a low visibility of the transparent pattern 19*a*, all things that need to be done is to adjust the refractive index and film thickness of the transparent pattern 19*a*.

In the optical lens 1*a* having the aforesaid configuration, a hard coat film, an antireflection film and a water-repellent film may also be laminated to the optical lens 1*a* on the surface that forms the inner side of the spectacles configured by the optical lens 1*a* (i.e., on the surface facing the wearer) one on another in this order from the side of the lens substrate 11.

<Method for Producing Optical Lens of First Embodiment>

FIG. 2 is a flowchart showing a producing procedure of the optical lens of the first embodiment having the aforesaid configuration. FIGS. 3A to 5C are producing process drawings showing the producing procedure of the optical lens of the first embodiment having the aforesaid configuration. The producing procedure of the optical lens of the first embodiment will be described below based on these drawings, in the case where the optical lens is applied to spectacles.

Figure 3A:
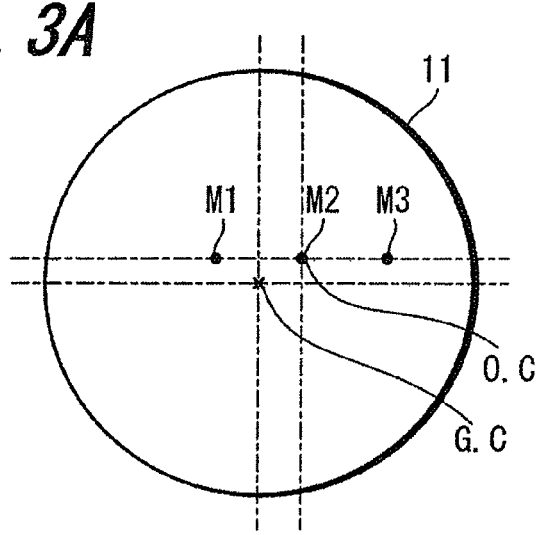
FIGS. 3A, 3B and 3C are producing process drawings (part one) showing the producing procedure of the optical lens according to the first embodiment.
Figure 3B:
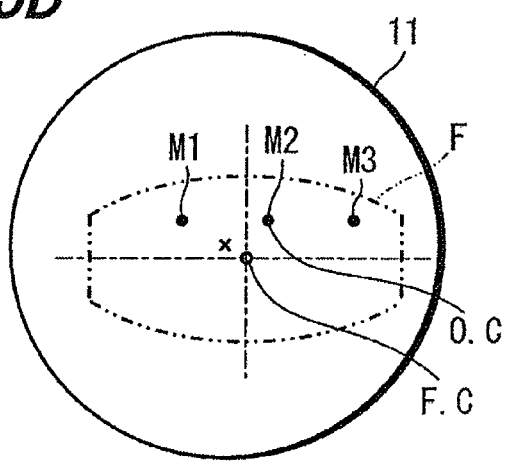
Figure 3C:
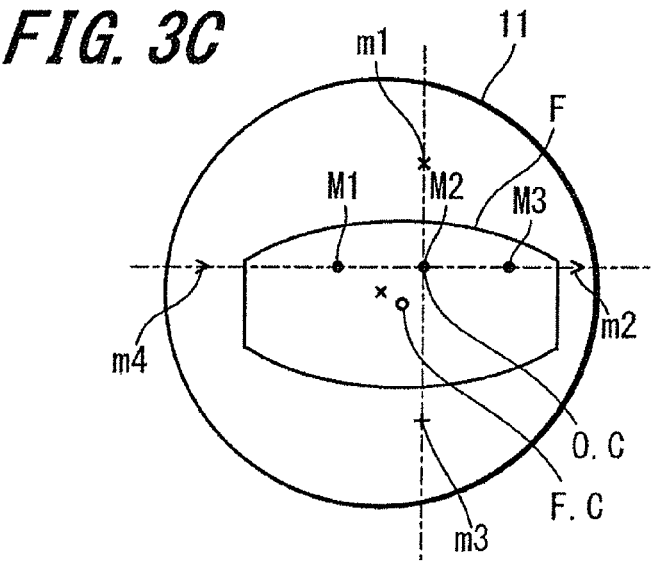

First, as shown in FIGS. 3A to 3C, reference marks m1 to m4 for performing position alignment are formed outside the lens region of the lens substrate (S 1). Such step is performed as below.

[FIG. 3A]

First, as shown in FIG. 3A, the lens substrate 11 is prepared. The following description is based an example in which the lens substrate is a spectacle single-vision lens.

A geometric center G.C and an optical center O.C are determined for the lens substrate 11 by measurement. Further, tentative dot marks M1 to M3, which show optical coordinates including the optical center O.C, are marked on the side of the one principal surface of the lens substrate 11. The dot marks M1 to M3 are marked using red ink, for example. As an example, the optical center O.C is regarded as the center dot mark M2, and the dot marks M1, M3 are arranged respectively on the right side and left side of the center dot mark M2 at two points apart from the center dot mark M2 by equal distance.

[FIG. 3B]

Next, as shown in FIG. 3B, the position of the center (frame center) F.C of a contour shape F of the lens substrate 11 is detected based on both the data of the three-dimensional contour shape F of the optical lens created according to the order and the optical coordinates indicated by the dot marks M1 to M3 on the lens substrate 11.

[FIG. 3C]

Thereafter, as shown in FIG. 3C, based on the relationship between the optical center O.C and the frame center F.C, the contour shape F of a lens region is determined with respected to the lens substrate 11. Further, based on the dot marks M1 to M3 which indicate the optical coordinates, the reference marks m1 to m4 are formed on the lens substrate 11, wherein the reference marks m1 to m4 serve as a reference of the contour shape F. The reference marks m1 to m4 are designed so that the upper side, lower side, right side and left side of the lens can be distinguished. Further, it is preferred that the reference marks m1 to m4 are designed so that it is possible to distinguish whether the lens is a right lens or a left lens of the spectacles. For example, the reference marks m2, m4, which indicate the right and left, are marked as arrows pointing to the center of the spectacles.

Further, the reference marks m1 to m4 are marked at the points outside the lens region surrounded by the contour shape F. Thus, after shape-cutting the lens substrate 11 to match the contour shape F, the reference marks m1 to m4 marked on the lens will not be left. Incidentally, the drawing shows a case where the reference marks m1 to m4 are laid out with the optical center O.C as a reference. However, the reference marks m1 to m4 may also be laid out with the frame center F.C as a reference.

The aforesaid reference marks m1 to m4 are directly formed on the one principal surface of the lens substrate 11 by, for example, a laser marker. At this time, laser is irradiated on the lens substrate 11, wherein the power of the laser is set to a level so that the lens substrate 11 will not be damaged due to the heat influence. Incidentally, the reference marks m1 to m4 do not have to be formed by a laser marker, but may also be formed by other methods such an inkjet method. At this time, it is important to select a material as the ink for forming the marks, so that the marks will not be removed together with a masking layer when performing a masking layer removing step (which is to be described later). Further, the reference marks m1 to m4 may also be formed by writing a marking-off mark by hand, for example.

The process for forming the reference marks m1 to m4 described above is based an example in which the lens substrate 11 is a single-vision lens. However, the lens substrate 11 does not have to be a single-vision lens, but may also be a multi-focal lens, a progressive-addition lens or other lens. In the case where a multi-focal lens is used, the frame center F.C is detected with the vertex of a portion called "segment" as a reference, so as to determine the contour shape F and form the reference marks m1 to m4. In the case where a progressive-addition lens is used, the frame center F.C is detected with a hidden mark (layout reference mark) as a reference, so as to determine the contour shape F and form the reference marks m1 to m4. Further, in the case where a progressive-addition lens is used, a prism reference point is regarded as the center dot mark M2, and the dot marks M1, M3 are arranged respectively on the right side and left side of the center dot mark M2 at two points apart from the center dot mark M2 by equal distance, and the reference marks m1 to m4 may be laid out based on the dot marks M1 to M3.

After the reference marks m1 to m4 are formed, the dot marks M1 to M3 are rubbed off.

[FIG. 4A, FIG. 4B]

Figure 4A:
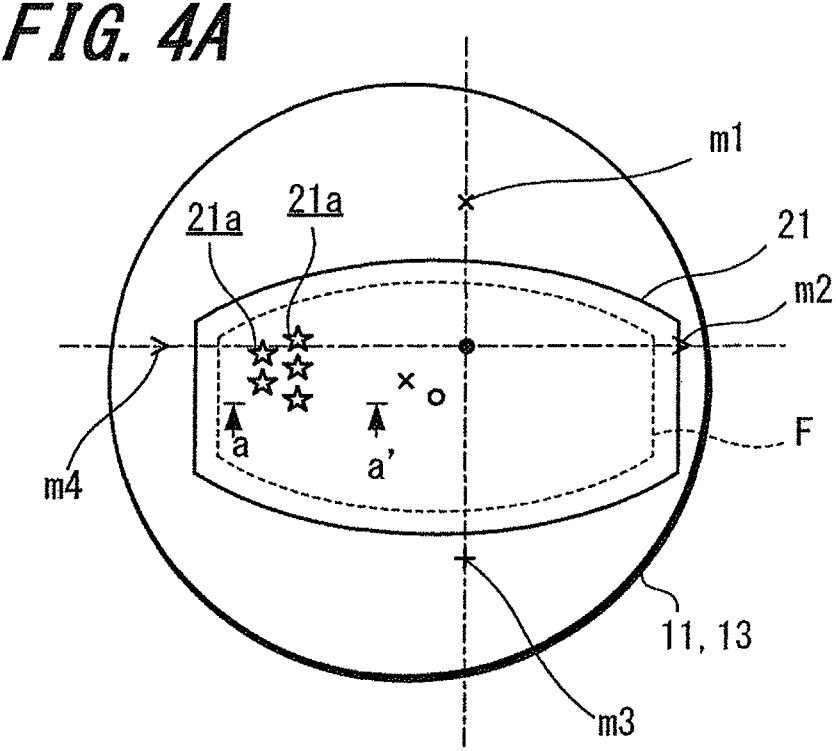
FIGS. 4A and 4B are producing process drawings (part two) showing the producing procedure of the optical lens according to the first embodiment.
Figure 4B:
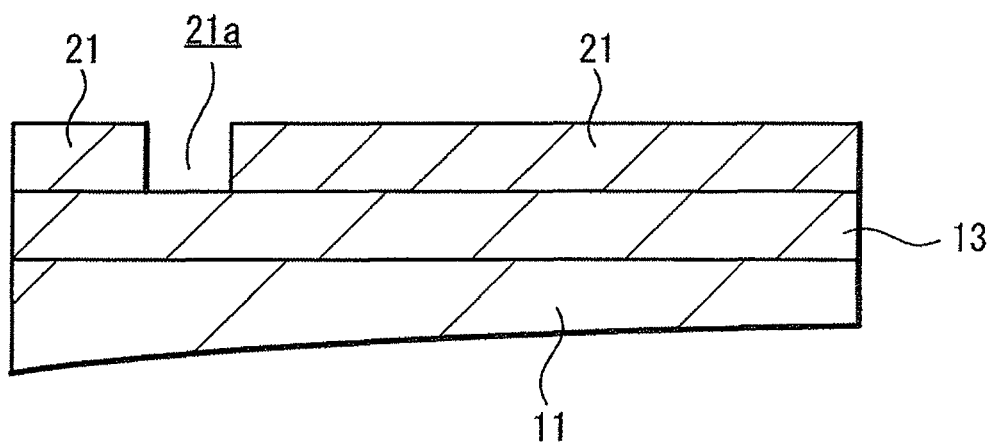

After the reference marks m1 to m4 have been formed in the aforesaid manner, the hard coat film 13 is formed on the lens substrate 11 as shown in the plan view of FIG. 4A and the cross sectional view of FIG. 4B (equivalent to a cross section taken along line a-a' of FIG. 4A) (S2). The hard coat film 13 is formed by, for example, a dipping method using a solution having an organosilicon compound dissolved therein.

Next, a modification treatment is performed for the surface of the hard coat film 13 (S3). As the modification treatment, a treatment for ensuring wettability of the surface of the hard coat film 13 with respect to the ink to be used for forming the masking layer in the next step is performed. Here, as a treatment method that does not cause damage to the surface of the hard coat film 13, a plasma treatment using an oxygen plasma is performed, for example. Incidentally, the modification treatment for ensuring wettability does not have to be limited to the plasma treatment, but may also be other methods as long as such methods do not caused damage to the hard coat film 13; for example, the modification treatment may also be an ion irradiation treatment, a corona discharge treatment, an alkali treatment or the like.

Next, an inkjet method is used to pattern-form the masking layer 21 from above the side of the one principal surface of the lens substrate 11 (i.e., the hard coat film 13 having been subjected to the modification treatment is regarded as a base, and the inkjet method is used to pattern-form the masking layer 21 on the surface of the base) (S4). The masking layer 21 formed here covers the entire contour shape F of the optical lens, and has an aperture pattern 21a that corresponds to the transparent pattern to be formed on the optical lens, wherein the contour shape F is established on the side of the one principal surface of the lens substrate 11. Incidentally, it is preferred that the shape of the masking layer 21 is several millimeters larger than the contour shape F, so that error caused when shape-cutting the lens substrate 11 to match the contour shape F can be absorbed.

At this time, it is important to arrange the aperture pattern 21a at a predetermined position on the lens substrate 11 preset based on the previously-created reference marks m1 to m4 to print and form the masking layer 21, without being affected by the curve of the lens substrate 11. To achieve this purpose, the masking layer 21 is formed using an inkjet method. The inkjet method used here is not particularly limited in type and method, but may either be a continuation type or an on-demand type; and if the inkjet method is an on-demand type, it may either be a piezo method or a thermal method.

Here, the ink used to form the masking layer 21 by the inkjet method is an ultraviolet cure ink (UV cure ink), for example. The ink used here can be selectively removed with respect to the hard coat film 13 even after being cured. Examples of such ink include so-called a hard UV ink and a soft UV ink, both of which are adapted to be applied to a high-adhesion/high adhesiveness non-absorbable material and can be removed by being dissolved in ethanol, acetone or the like after being cured.

In the inkjet method using such ink, it is important to adjust printing conditions to thereby form the masking layer 21 as a continuous film without uneven coating. Examples of the printing conditions include moving speed of the lens substrate with respect to the print head, resolution in moving direction, resolution in width direction perpendicular to the moving direction, size of ink droplet, drop frequency of ink droplet, number of the ink droplets dropped to the same point-of-impact, and the like. Since these printing conditions are correlated to each other, the masking layer 21 without uneven print is formed by suitably adjusting the printing conditions.

After the masking layer 21 has been formed using the aforesaid inkjet method, ultraviolet light (UV) is irradiated on the masking layer 21 to thereby cure the ink constituting the masking layer 21.

[FIG. 5A]

Figure 5A:
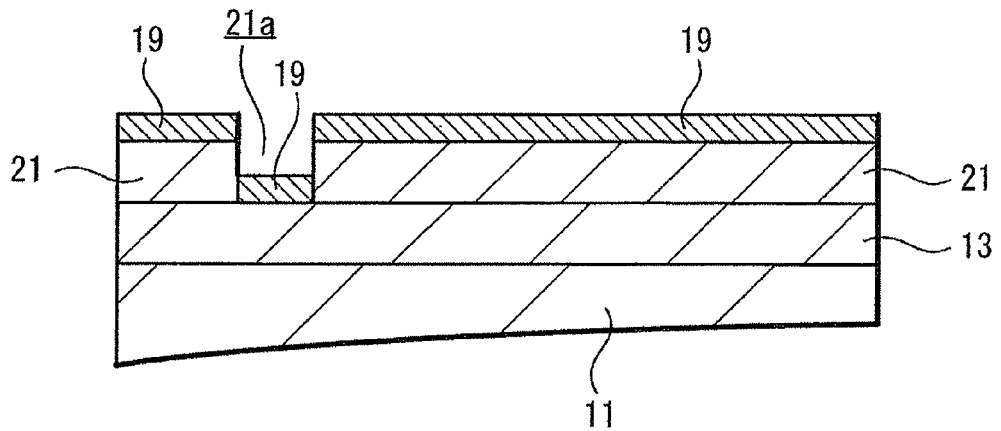
FIGS. 5A, 5B and 5C are producing process drawings (part three) showing the producing procedure of the optical lens according to the first embodiment.

Next, as shown in FIG. 5A, a transparent material film 19 is formed from above the masking layer 21 (S5). By performing such step, a film-forming treatment is selectively performed with respect to the surface of the hard coat film 13 exposed from the bottom of the aperture pattern 21a of the masking layer 21. Here, an evaporation method is used to form the transparent material film 19 at a predetermined film thickness (for example, 10 nm), wherein the transparent material film 19 is formed of tantalum oxide ($Ta_2O_5$) and has a refractive index of 2.05 to 2.15, for example. When forming film, it is preferred that an ion assisted deposition is performed to thereby form the transparent material film 19 with excellent film-quality and adhesion.

[FIG. 5B]

Figure 5B:
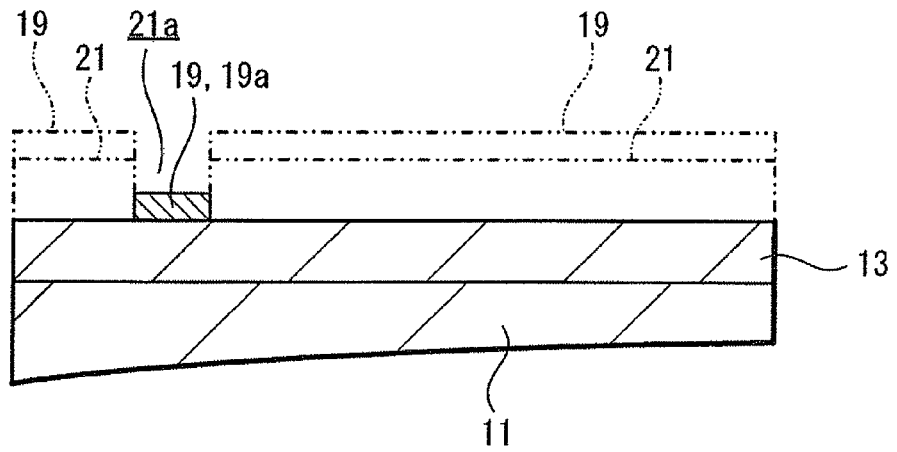

Next, as shown in FIG. 5B, a treatment is performed to remove the masking layer 21 from above the hard coat film 13, so that the transparent material film 19 above the masking layer 21 is selectively removed along with the masking layer (S6). Here, the masking layer 21 is removed by performing, for example, a wet process using a solvent (ethanol, acetone or the like) to dissolve the masking layer 21. By performing such process, only the part of the transparent material film 19 formed within the aperture pattern 21a of the masking layer 21 remains on the lens substrate 11 through the hard coat film 13, and the remaining part of the transparent material film 19 is formed as the transparent pattern 19a on the lens substrate 11. The transparent pattern 19a formed in such manner is formed at the same position and with the same shape as the aperture pattern 21a formed in the masking layer 21.

[FIG. 5C]

Figure 5C:
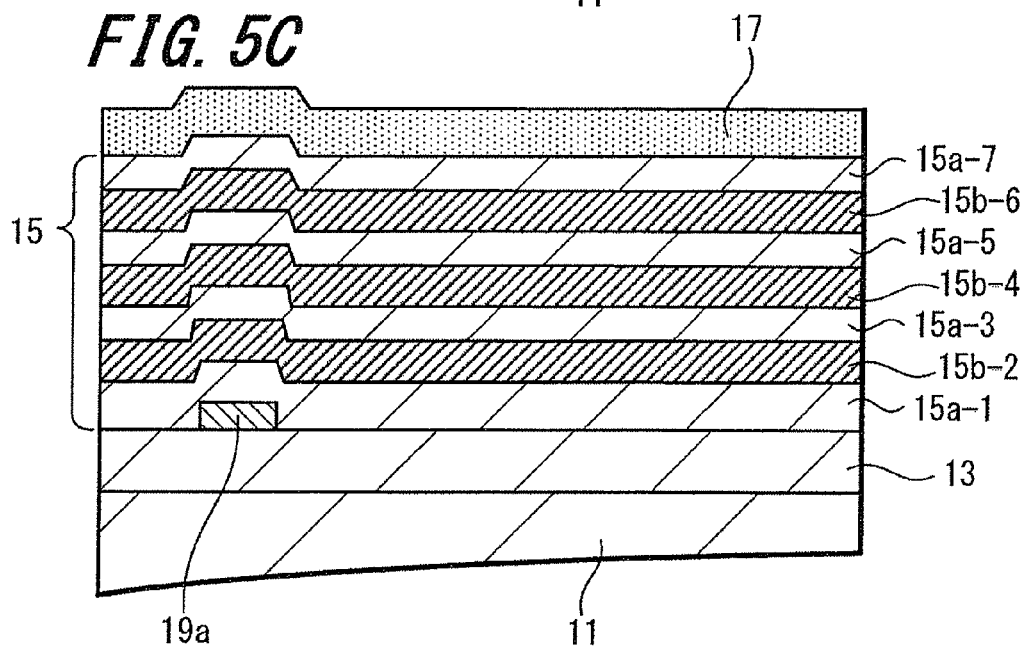

Next, as shown in FIG. 5C, the antireflection film 15 is formed on the hard coat film 13 on which the transparent pattern 19a has been formed, and further, the water-repellent film 17 is formed on the antireflection film 15, wherein the antireflection film 15 has a multi-layer structure formed by alternately laminating the low refractive index film 15a and the high refractive index film 15b one upon another (S7). The antireflection film 15 is formed by performing ion assisted deposition to thereby form respective layers one upon another, with each composition and each film thickness, in the order from the low refractive index film 15a-1, which is arranged on the side of the underlying layer, to the low refractive index film 15a-7.

[FIG. 1A, FIG. 1B]

Thereafter, as shown in FIGS. 1A and 1B, the lens substrate 11, which has various layers up to the water-repellent film 17 formed thereon, is shape-cut to match the contour shape F determined with respect to the lens substrate 11 (S8). At this time, as shown in FIG. 4A, a processing jig is absorbed onto the lens substrate 11 at a predetermined position aligned based on the reference marks m1 to m4 formed outside the contour shape F of the lens substrate 11, so that the lens substrate 11 is fixed to the processing jig. In such a state, a shape-cutting machine is used to shape-cut the lens substrate 11 into the contour shape F aligned based on the reference marks m1 to m4, and then the processing jig is detached to complete the optical lens 1a. Then, after performing an appearance inspection, the optical lens 1a is shipped.

<Advantages of First Embodiment>

In the aforesaid method for producing the optical lens according to the first embodiment, as described with reference to FIG. 5A, by performing the film-forming treatment from above the masking layer 21, the transparent pattern 19a, as a processed pattern, is formed within the aperture of the masking layer 21. Thus, the transparent pattern 19a can be formed by a material suitable for forming film by an evaporation method. Further, the transparent pattern 19a (i.e., the processed pattern) is formed on the lens substrate 11 in the portion exposed from the bottom of the aperture pattern 21a formed in the masking layer 21. Thus, the transparent pattern 19a (processed pattern) with high position accuracy and high shape accuracy can be obtained following the forming accuracy of the masking layer 21 by the inkjet method. As a result, it is possible to form the transparent pattern 19a, as a processed pattern with high accuracy, at a predetermined position on the lens substrate 11, wherein the transparent pattern 19a is formed of a material which is though not suitable to be used to form a pattern by high-accuracy pattern-forming methods such as an inkjet method, for example, but is suitable to be used to form a film by film-forming methods such as an evaporation method.

In the optical lens 1a having the configuration of the first embodiment obtained in the aforesaid manner, by laminating the transparent pattern 19a to the antireflection film 15 with the multi-layer structure, the light reflection characteristic of the light incident to the optical lens 1a from the side of the antireflection film 15 is different between the portion where the transparent pattern 19a is formed and the portion where the transparent pattern 19a is not formed. Thus, when viewing the lens 1a through the water-repellent film 17 from the side of the antireflection film 15, the antireflection function of the antireflection film 15 can be maintained, yet the transparent pattern 19a can be easily viewed as the aforesaid difference of the light reflection characteristic. On the other hand, in the case where the optical lens 1a is used to form a pair of spectacles and where the optical lens 1a is viewed at a very close distance from the side of the wearer of the spectacles (i.e., from the side opposite the antireflection film 15 and the water-repellent film 17), the transparent pattern 19a is not easily viewed.

As a result, by using the optical lens 1a, it is possible to configure a pair of spectacles excellent in design by forming the transparent pattern 19a as an ornamental pattern, logo, character or the like, for example, wherein the transparent pattern 19a can be viewed from outside, while the field of vision of the wearer can be ensured without discomfort.

According to the first embodiment, the transparent pattern 19a is arranged between the lens substrate 11 and the antireflection film 15, more particularly, between the hard coat film 13 and the low refractive index film 15a-1, which constitutes the antireflection film 15. With such a configuration, it is possible to obtain a normal lens configuration in which the surface of the lens substrate 11 on the side of the one principal surface is evenly covered by the antireflection film 15, without impairing the continuity of the layer structure of the antireflection film 15. Thus, the surface of the antireflection film 15 can be evenly covered by the low refractive index film 15a-7, which is formed of a material excellent in abrasion resistance such as silica dioxide ($SiO_2$), so that it is possible to form a lens configuration less susceptible to damage. Further, continuity of the process when forming the antireflection film 15 with the multi-layer structure is also not impaired.

Further, in such a configuration, if the refractive index of the transparent pattern 19a is higher than both the refractive indexes of both the hard coat film 13 and the low refractive index film 15a-1, which sandwich the transparent pattern 19a, the visibility of the transparent pattern 19a when viewing the optical lens 1a from the side of the antireflection film 15 can be improved even if the transparent pattern 19a is a thin film with a single layer structure. For example, in the case where the transparent pattern 19a is formed by a single layer of tantalum oxide ($Ta_2O_5$) having a film thickness of 10 nm, one-side luminous reflectance viewed from the side of the antireflection film 15 is 1.624% in the portion where the transparent pattern 19a is formed and 0.545% in the portion where the transparent pattern 19a is not formed, so that it is confirmed that sufficient visibility of the transparent pattern 19a can be obtained.

2. Second Embodiment

Configuration of Optical Lens According to Second Embodiment

Figure 6A:
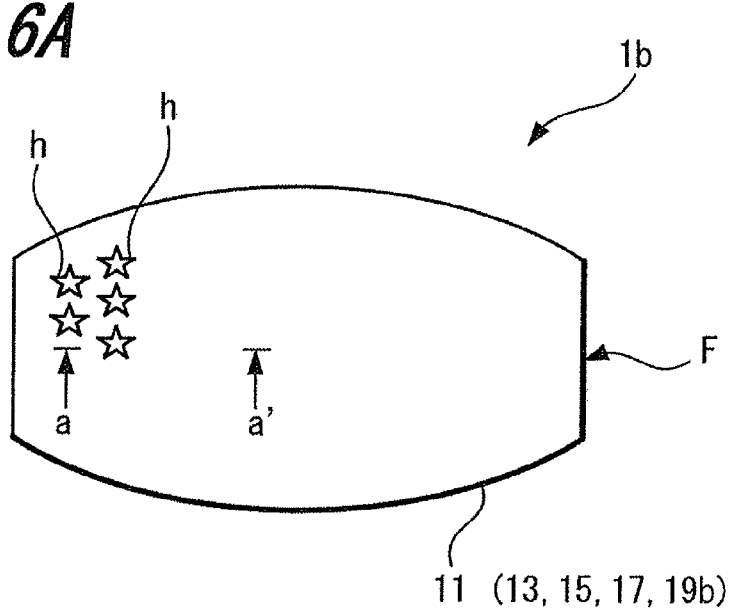
FIGS. 6A and 6B are respectively a plan view and a cross-sectional view showing the configuration of an optical lens produced by a method according to a second embodiment.
Figure 6B:
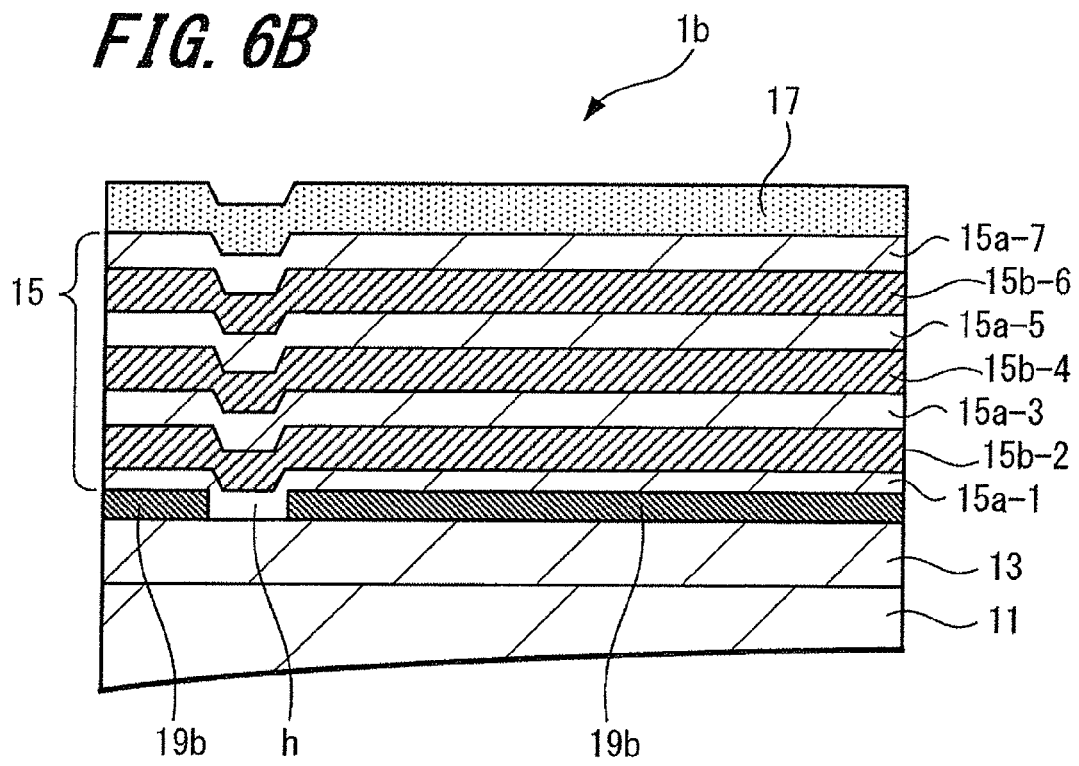

FIGS. 6A and 6B are views for explaining the configuration of an optical lens 1b according to a second embodiment, wherein FIG. 6A is a plan view, and FIG. 6B is a cross section taken along line a-a' of FIG. 6A. The optical lens 1b of the second embodiment shown in these drawings is identical to the optical lens (1a) of the first embodiment except that a transparent pattern 19b formed as a processed pattern which constitutes an ornamental pattern, logo, character or the like is configured as a punched pattern having an aperture h.

The transparent pattern 19b having the aperture h may have the same configuration as that of the island-like transparent pattern (19a) described in the first embodiment except for the planar shape. To be specific, the transparent pattern 19b needs to have transparency with respect to visible light, for example; and it is particularly preferred that the refractive index of the transparent pattern 19b is higher than the refractive indexes of the layers that sandwich the transparent pattern 19b. The transparent pattern 19b has a film thickness which is suitably adjusted based on both the refractive index of the material constituting the transparent pattern 19b and the required visibility of the transparent pattern 19b when viewed from the side of the water-repellent film 17, and further, the transparent pattern 19b may also be formed by laminating a plurality of different material layers one upon another.

<Method for Producing Optical Lens of Second Embodiment>

The method for producing the optical lens 1b of the second embodiment having the aforesaid configuration is identical to that of the first embodiment. However, in the process for forming the masking layer 21 described with reference to FIGS. 4A and 4B, a masking layer having a reversed pattern may be formed by using a high-accuracy pattern-forming method such as an inkjet method, for example.

<Advantages of Second Embodiment>

Similar to the producing method of the first embodiment, in the second embodiment, since the same method as the first embodiment is used, it is also possible to form the transparent pattern 19b, as a processed pattern with high accuracy, at a predetermined position on the lens substrate 11, wherein the transparent pattern 19b is formed of a material which is though not suitable to be used to form a pattern by high-accuracy pattern-forming methods such as an inkjet method, for example, but is suitable to be used to form a film by film-forming methods such as an evaporation method.

The optical lens 1b of the second embodiment has the same configuration as that of the optical lens of the first embodiment, i.e., the transparent pattern 19b is laminated between the hard coat film 13 and the low refractive index film 15a-1 of the antireflection film 15. Thus, similar to the first embodiment, by using the optical lens 1b, it is possible to configure a pair of spectacles excellent in design by forming the transparent pattern 19b as an ornamental pattern, logo, character or the like, for example, wherein the transparent pattern 19b can be viewed from outside, while the field of vision of the wearer can be ensured without discomfort; and continuity of the process when forming the antireflection film 15 with the multi-layer structure is also not impaired by providing the transparent pattern 19b. Further, similar to that described in the first embodiment, if the refractive index of the transparent pattern 19b is higher than the refractive indexes of both the hard coat film 13 and the low refractive index film 15a-1 of the antireflection film 15, which sandwich the transparent pattern 19b, the visibility of the transparent pattern 19b when viewing the optical lens 1b from the side of the antireflection film 15 can be improved even if the transparent pattern 19b is a thin film with a single layer structure.

3. Third Embodiment

Configuration of Optical Lens According to Third Embodiment

Figure 7A:
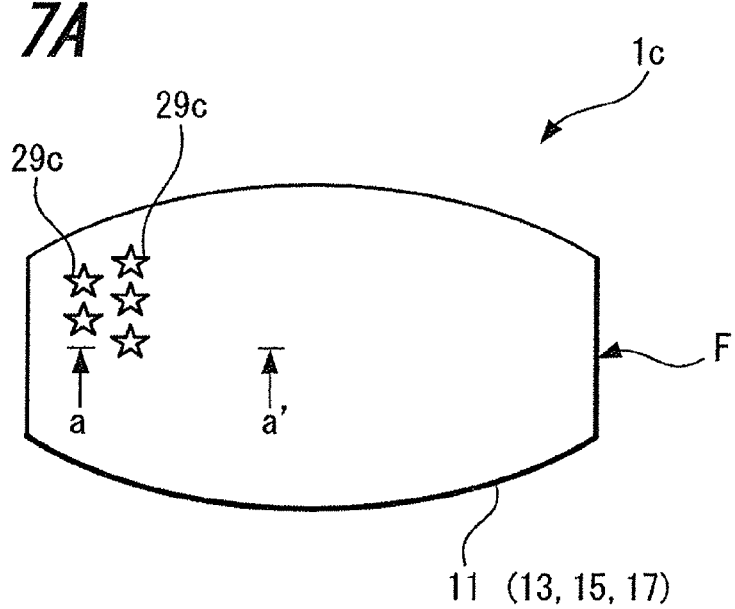
FIGS. 7A and 7B are respectively a plan view and a cross-sectional view showing the configuration of an optical lens produced by a method according to a third embodiment.
Figure 7B:
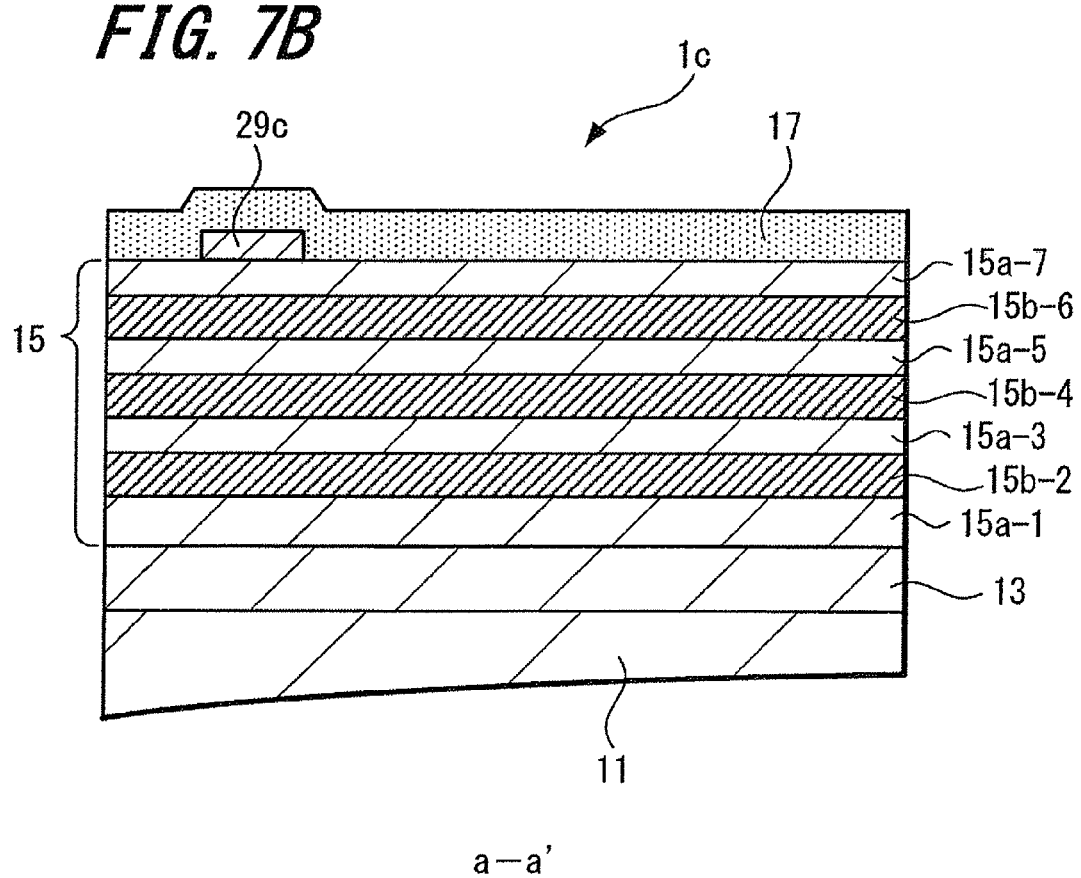

FIGS. 7A and 7B are views for explaining the configuration of an optical lens 1c according to a third embodiment, wherein FIG. 7A is a plan view, and FIG. 7B is a cross section taken along line a-a' of FIG. 7A. The optical lens is of the third embodiment shown in these drawings differs from the optical lenses (1a, 1b) of the other embodiments in that an island-like transparent pattern 29c (i.e., a processed pattern) formed as an ornamental pattern, logo, character or the like is laminated above the antireflection film 15, and other configurations are identical to those of the first embodiment.

Compared to the transparent patterns formed in both the first embodiment and the second embodiment, the transparent pattern 29c is arranged closer to the surface of the optical lens 1c. Thus, it is preferred that the transparent pattern 29c is formed of a material having low refractive index, such as silica dioxide ($SiO_2$) which is excellent in abrasion resistance. Like the other embodiments, the transparent pattern 29c has a film thickness which is suitably adjusted based on both the refractive index of the material constituting the transparent pattern 29c and the required visibility of the transparent pattern 29c when viewed from the side of the water-repellent film 17; and further, like the other embodiments, the transparent pattern 29c may also be formed by laminating a plurality of different material layers one upon another. Note that, in the case where the transparent pattern 29c has a laminated structure, it is preferred that the top layer portion of the transparent pattern 29c is configured by a material having low refractive index, such as silica dioxide ($SiO_2$) which is excellent in abrasion resistance.

<Method for Producing Optical Lens of Third Embodiment>

Figure 8:
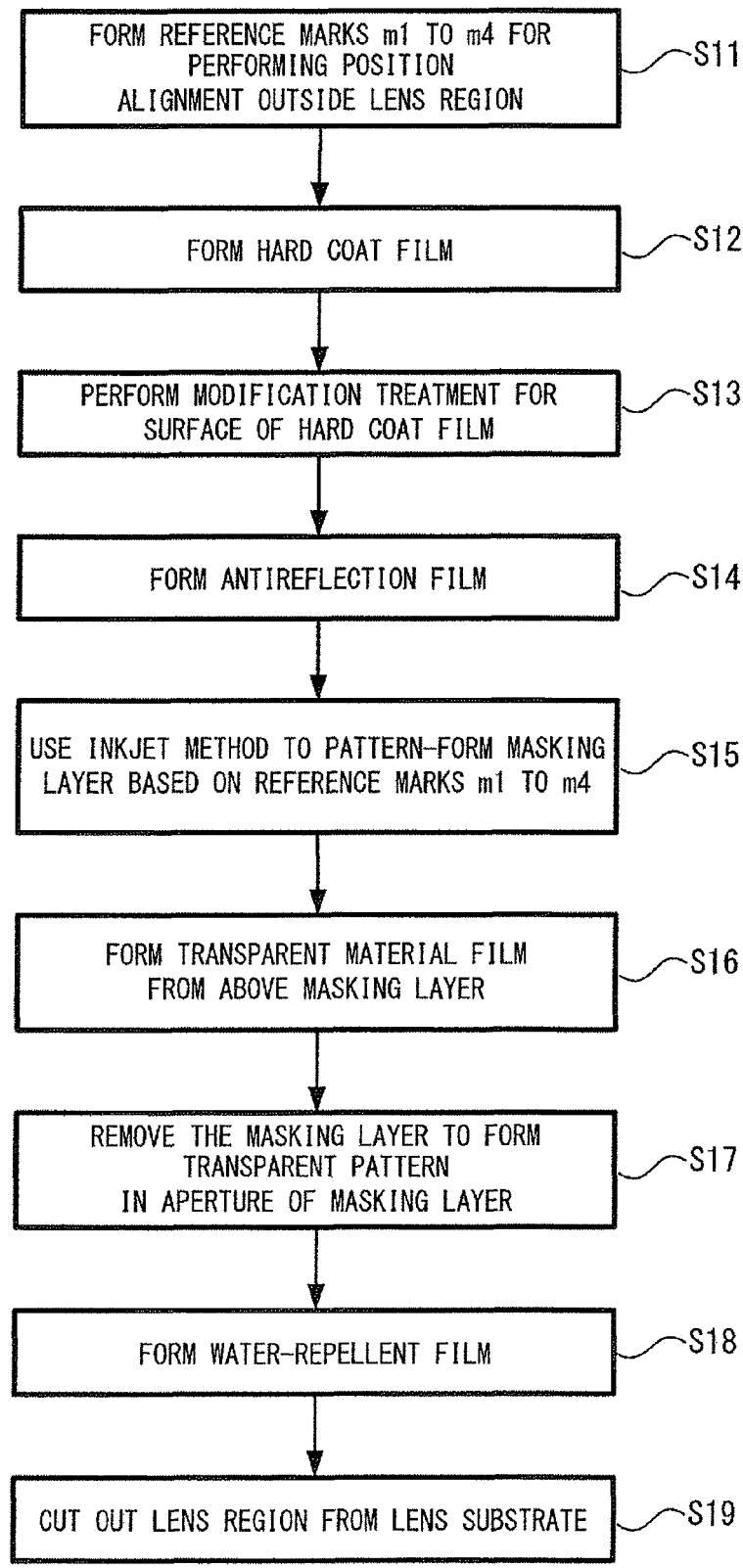
FIG. 8 is a flowchart showing a producing procedure of the optical lens of the third embodiment.

FIG. 8 is a flowchart showing a producing procedure of the optical lens of the third embodiment having the aforesaid configuration. FIGS. 9A, 9B, 10A and 10B are producing process drawings showing the producing procedure of the optical lens of the third embodiment having the aforesaid configuration. The feature of the producing procedure of the optical lens of the third embodiment will be described below with reference to these drawings, in the case where the optical lens is applied to spectacles.

[FIG. 9A]

Figure 9A:
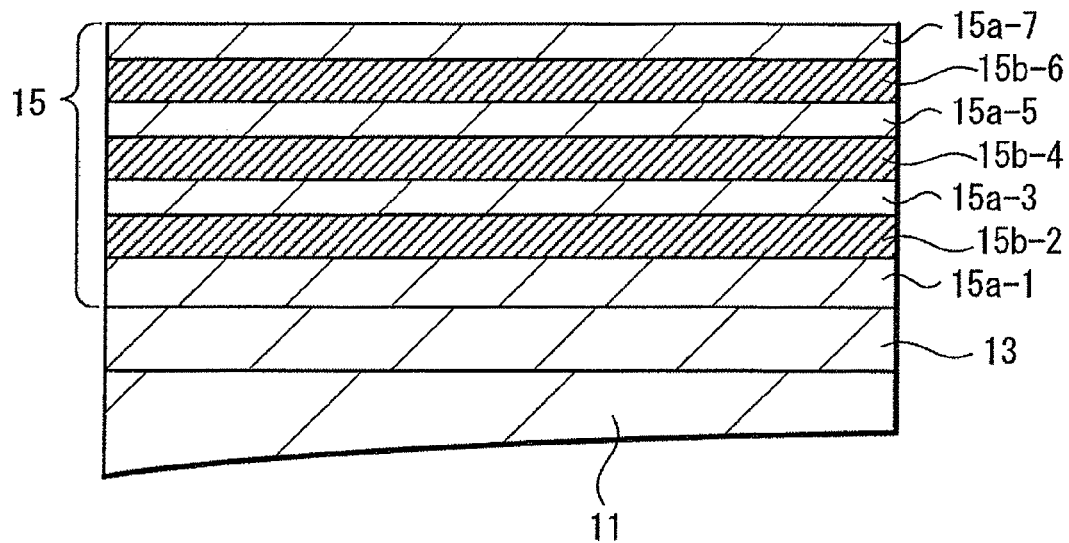
FIGS. 9A and 9B are producing process drawings (part one) showing the producing procedure of the optical lens according to the third embodiment.

First, the same process as shown in FIGS. 3A to 3C of the first embodiment is previously performed to form reference marks (m1 to m4), which are not shown here in FIG. 9A, on the side of the one principal surface of the lens substrate 11 (S11). Thereafter, the hard coat film 13 is formed on the one principal surface of the lens substrate 11 (S12), then a modification treatment for ensuring wettability of the surface of the hard coat film 13 is performed (S13), and then the antireflection film 15 with a multi-layer structure is formed (S14).

The aforesaid film-forming processes and modification treatment are performed in the same manner as the first embodiment, and the hard coat film 13 is formed by, for example, a dipping method using a solution having an organosilicon compound dissolved therein. As the modification treatment of the surface of the hard coat film 13, a plasma treatment using oxygen plasma, for example, is performed. Further, the antireflection film 15 is formed by performing ion assisted deposition to thereby form respective layers one upon another, with each composition and each film thickness, in the order from the low refractive index film 15a-1, which is arranged on the side of the underlying layer, to the low refractive index film 15a-7. However, considering that the transparent pattern is to be laminated, the film thickness of the low refractive index film 15a-7, which is the top layer of the antireflection film 15, may also be adjusted separately.

[FIG. 9B]

Figure 9B:
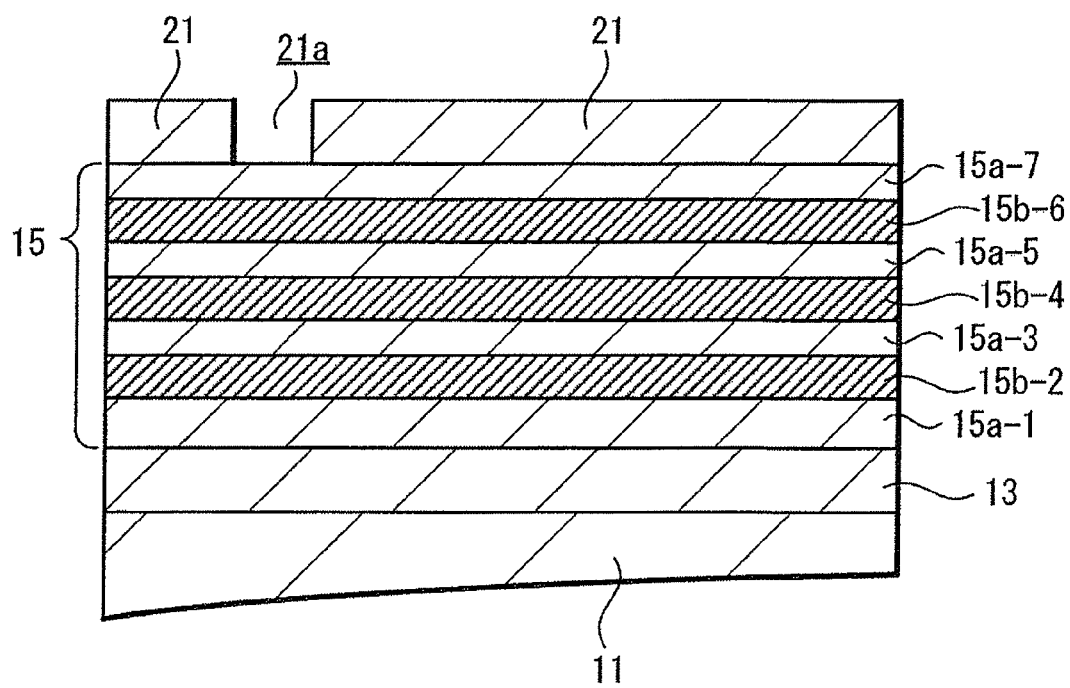

Next, as shown in FIG. 9B, the masking layer 21 is pattern-formed above the low refractive index film 15a-7 of the antireflection film 15 using, for example, the same inkjet method as is used in the first embodiment (S15). Similar to the first embodiment, the masking layer 21 formed here covers the entire contour shape of the lens, and has an aperture pattern 21a that corresponds to the transparent pattern formed on the optical lens, wherein the contour shape is established on the side of the one principal surface of the lens substrate 11. Further, similar to the first embodiment, the ink used in the inkjet method is, for example, a UV cure ink possible to be removed by being dissolved in ethanol, acetone or the like after being cured.

Incidentally, the modification treatment for ensuring wettability of the surface of the antireflection film 15 may also be performed before the masking layer 21 has been formed. The modification treatment is performed by a proper method. Further, similar to the first embodiment, after the masking layer 21 has been formed using the inkjet method, ultraviolet light (UV) is irradiated on the masking layer 21 to thereby cure the UV cure ink constituting the masking layer 21.

[FIG. 10A]

Figure 10A:
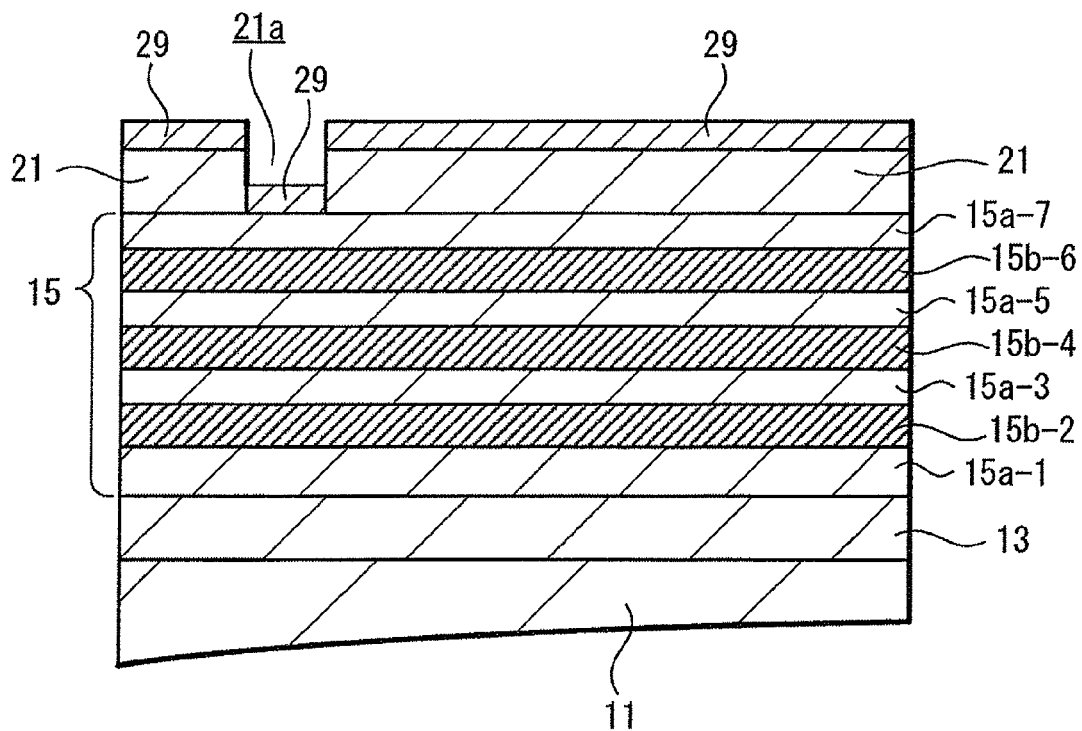
FIGS. 10A and 10B are producing process drawings (part two) showing the producing procedure of the optical lens according to the third embodiment.

Next, as shown in FIG. 10A, a transparent material film is formed from above the masking layer 21 (S16). By performing such step, a film-forming treatment is selectively performed with respect to the surface of the antireflection film 15 exposed from the bottom of the aperture pattern 21*a* of the masking layer 21. Here, an evaporation method is used to form the transparent material film 29 at a predetermined film thickness (for example, 10 nm), wherein the transparent material film 29 is formed of silica dioxide ($SiO_2$) and has a refractive index of 1.43 to 1.47, for example. When forming film, an ion assisted deposition is performed necessary according to necessity to thereby form the transparent material film 29 with excellent film-quality and adhesion.

[FIG. 10B]

Figure 10B:
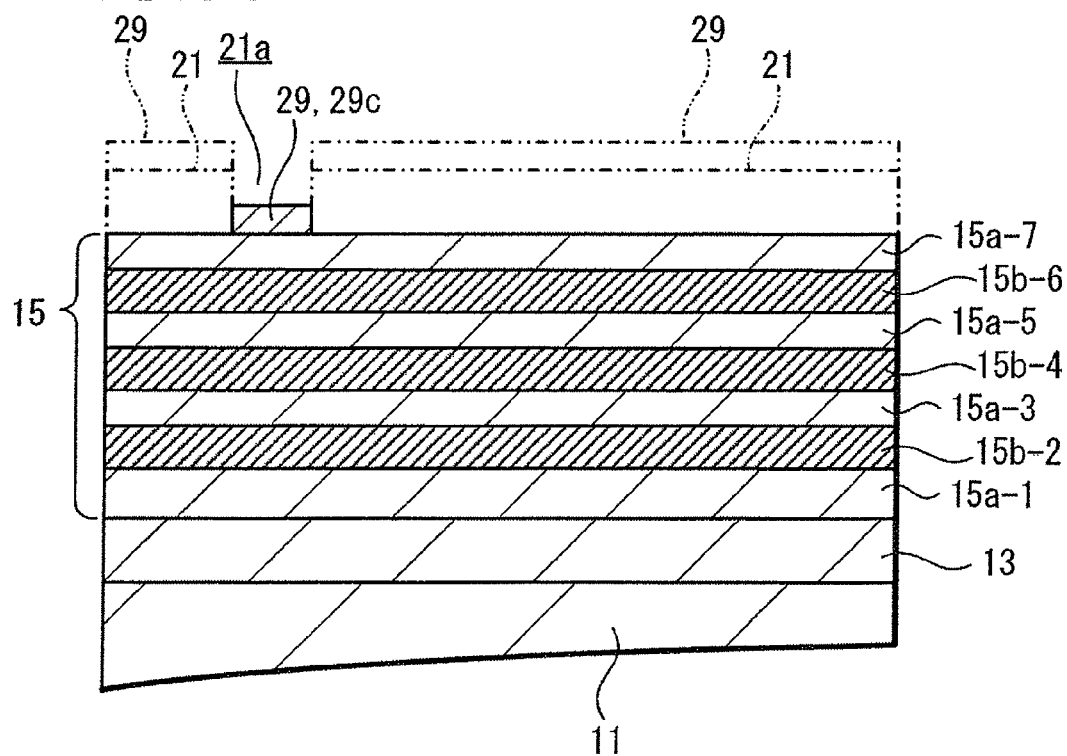

Thereafter, as shown in FIG. 10B, a treatment is performed to remove the masking layer 21 from above the antireflection film 15, so that the transparent material film 29 above the masking layer 21 is selectively removed along with the masking layer 21 (S17). Here, the masking layer 21 is removed by performing, for example, a wet process using a solvent (ethanol, acetone or the like) to dissolve the ink constituting the masking layer 21, so that the transparent material film 29 above the masking layer 21 is selectively removed along with the masking layer 21. By performing such process, only the part of the transparent material film 29 formed within the aperture pattern 21*a* of the masking layer 21 remains on the lens substrate 11 through the hard coat film 13 and antireflection film 15, and the remaining part of the transparent material film 29 is formed as the transparent pattern 29*c* on the lens substrate 11. The transparent pattern 29*c* formed in such manner is formed at the same position and with the same shape as the aperture pattern 21*a* formed in the masking layer 21.

[FIG. 7A, FIG. 7B]

Thereafter, as shown in FIGS. 7A and 7B, the water-repellent film 17 is formed onto the antireflection film 15 in a state where the transparent pattern 29*c* is covered (S18). Next, the lens substrate 11, which has various layers up to the water-repellent film 17 formed thereon, is shape-cut to match the contour shape F determined with respect to the lens substrate 11 (S19). At this time, similar to the process described in the first embodiment, the lens substrate 11 is shape-cut to match the contour shape F, which is aligned based on the reference marks m1 to m4 formed outside the contour shape F of the lens substrate 11.

<Advantages of Third Embodiment>

In the aforesaid method for producing the optical lens according to the third embodiment, as described with reference to FIG. 10A, by performing the film-forming treatment from above the masking layer 21, the transparent pattern 29*a*, as a processed pattern, is formed on the bottom of the aperture pattern 21*a* of the masking layer 21. Thus, similar to the first embodiment, it is possible to form the transparent pattern 29*a*, as a processed pattern with high accuracy, at a predetermined position on the lens substrate 11, wherein the transparent pattern 29*a* is formed of a material which is though not suitable to be used to form a pattern by high-accuracy pattern-forming methods such as an inkjet method, for example, but is suitable to be used to form a film by film-forming methods such as an evaporation method.

Similar to the configuration of the optical lenses of the other embodiments, in the optical lens 1*c* of the third embodiment obtained in the aforesaid manner, the transparent pattern 29*c* is also laminated onto the antireflection film 15, which has a multi-layer structure. Thus, similar to the other embodiments, by using the optical lens 1*c*, it is possible to configure a pair of spectacles excellent in design by forming the transparent pattern 29*c* as an ornamental pattern, logo, character or the like, wherein the transparent pattern 29*c* can be viewed from outside while the field of vision of the wearer can be ensured without discomfort.

The third embodiment is described based on a configuration in which the island-like transparent pattern 29*c* is laminated onto the antireflection film 15; however, a transparent pattern having an aperture, like the transparent pattern of the second embodiment, may also be used as the transparent pattern to be laminated onto the antireflection film 15; in such a case, the same advantages as the third embodiment can be obtained.

Further, the aforesaid first to third embodiments are described based on a configuration in which the transparent pattern is laminated above or below the antireflection film 15; however, the transparent pattern may also be arranged between the layers of the antireflection film 15, which has the multi-layer structure. In such a case, like the other embodiments described above, the transparent pattern has a film thickness which is suitably adjusted based on both the refractive index of the material constituting the transparent pattern and the required visibility of the transparent pattern when viewed from the side of the water-repellent film 17, and further, like the other embodiments described above, the transparent pattern may also be formed by laminating a plurality of different material layers one upon another.

4. Fourth Embodiment

Configuration of Optical Lens According to Fourth Embodiment

Figure 11A:
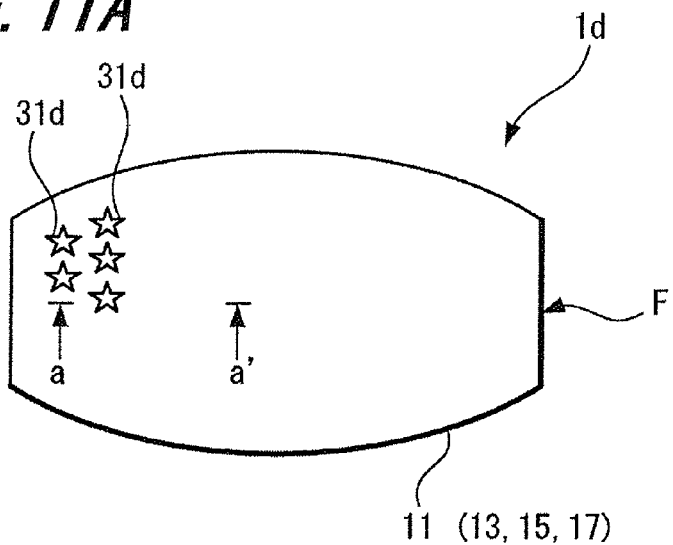
FIGS. 11A and 11B are respectively a plan view and a cross-sectional view showing the configuration of an optical lens produced by a method according to a fourth embodiment.
Figure 11B:
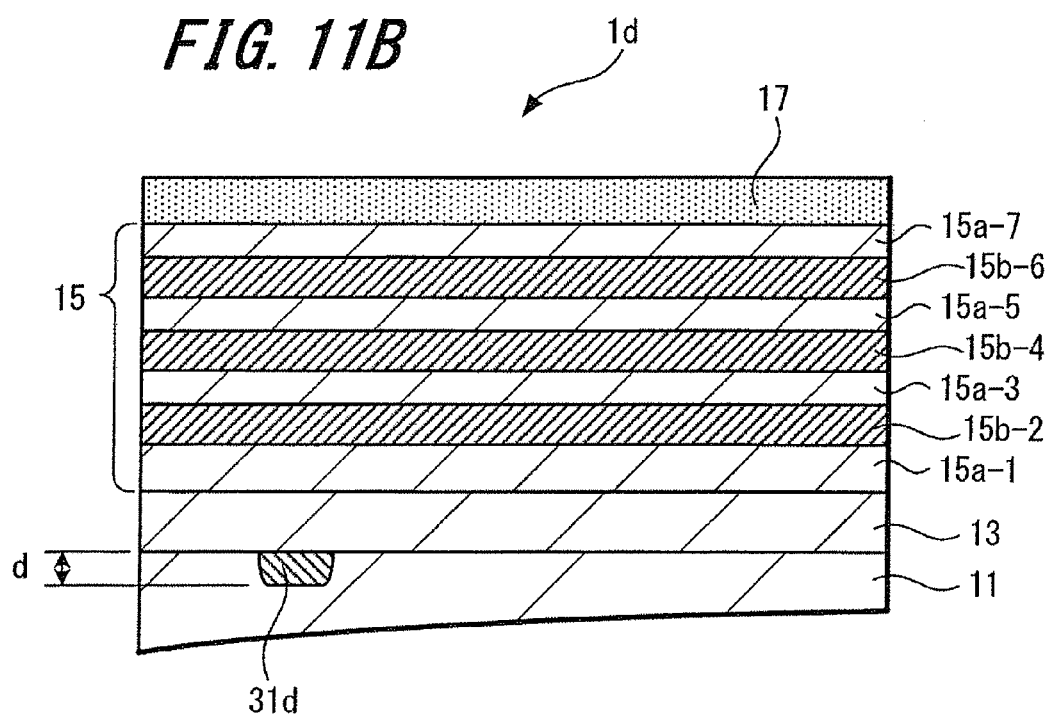

FIGS. 11A and 11B are views for explaining the configuration of an optical lens 1*d* according to a fourth embodiment, wherein FIG. 11A is a plan view, and FIG. 11B is a cross section taken along line a-a' of FIG. 11A. The optical lens 1*d* of the fourth embodiment shown in these drawings differs from the optical lenses (1*a* to 1*c*) of the first to third embodiments in that an island-like dyed pattern 31*d* is provided as a processed pattern, and other configurations are identical to those of the first embodiment.

To be specific, assuming either the concave surface or the convex surface is one principal surface, the dyed pattern 31*d*, which is provided as a processed pattern, is arranged in the surface layer on the side of the one principal surface. The depth d of the dyed pattern 31*d* in the surface layer and the concentration of the dye of the dyed pattern 31*d* are suitably adjusted based on the required visibility of the dyed pattern 31*d* when viewed from the side of the water-repellent film 17. Particularly, it is preferred that the depth of the dyed pattern 31*d* and the concentration of the dye of the dyed pattern 31*d* are adjusted so that the dyed pattern 31*d* is not easily viewed in the case where the optical lens 1*d* is used to form a pair of spectacles and where the optical lens 1*d* is viewed at a very close distance from the side opposite the water-repellent film 17.

The dye that constitutes such dyed pattern 31*d* may be a material capable of dyeing the lens substrate 11, which is formed of a plastic material; and a proper material is used as the dye depending on the dyeing method for forming the dyed pattern 31*d*. For example, in the case where a sublimation dyeing method is used to dye the lens substrate 11 to form the dyed pattern 31*d*, a sublimation dye will be used as the dye. Further, in the case where a dipping method is used to dye the lens substrate 11, a dye adapted for dipping method will be used.

A hard coat film 13, an antireflection film 15 with a multi-layer structure, and a water-repellent film 17, each film having the same configuration as that of the other embodiments, are laminated in this order to the one principal surface of the lens substrate 11 to which the aforesaid dyed pattern 31*d* is provided.

<Method for Producing Optical Lens of Fourth Embodiment>

Figure 12:
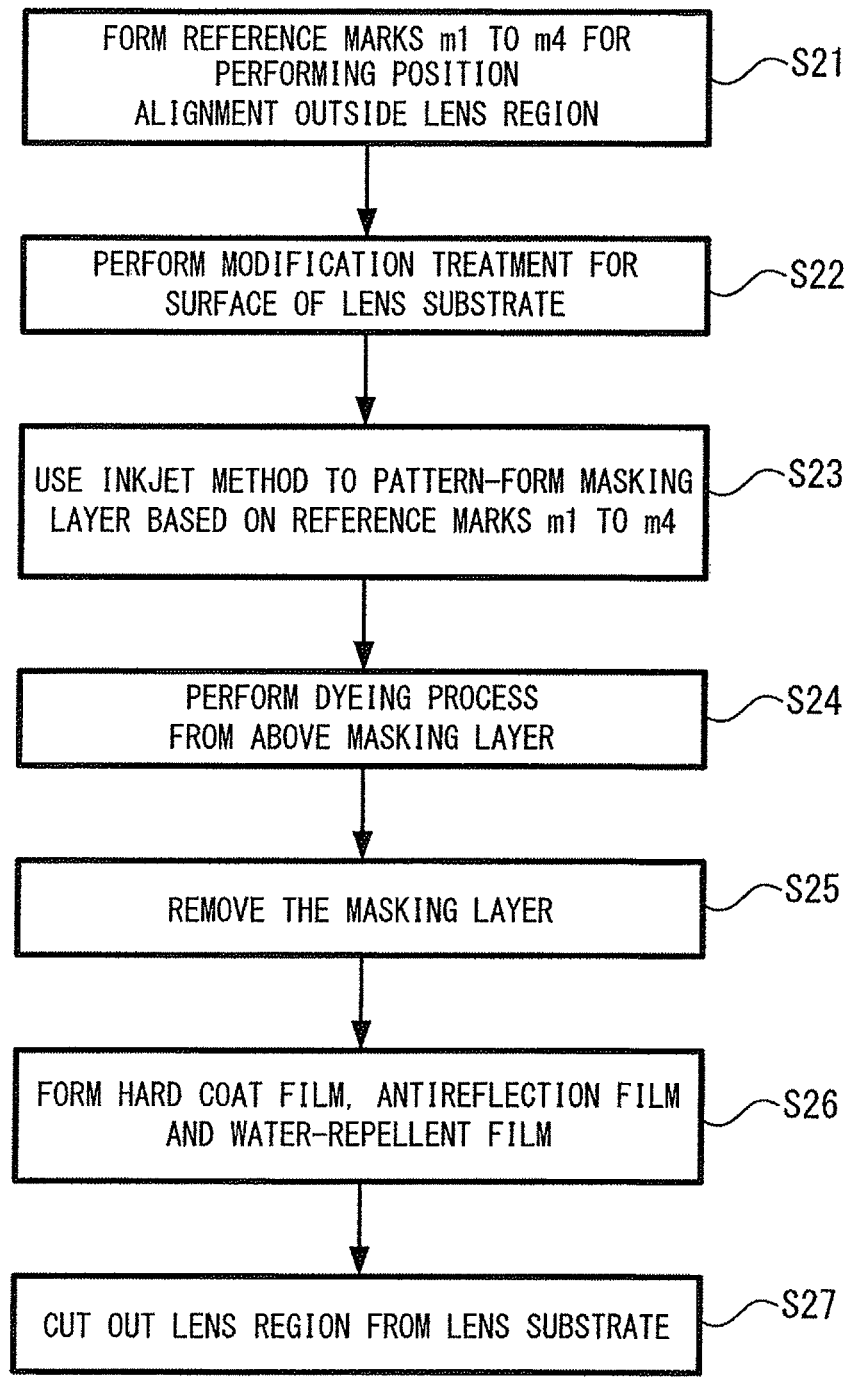
FIG. 12 is a flowchart showing a producing procedure of the optical lens of the fourth embodiment.

FIG. 12 is a flowchart showing a producing procedure of the optical lens of the fourth embodiment having the aforesaid configuration. FIGS. 13A, 13B, 14A, 14B and 14C are producing process drawings showing the producing procedure of the optical lens of the fourth embodiment having the aforesaid configuration. The feature of the producing procedure of the optical lens of the fourth embodiment will be described below with reference to these drawings, in the case where the optical lens is applied to spectacles.

[FIG. 13A, FIG. 13B]

Figure 13A:
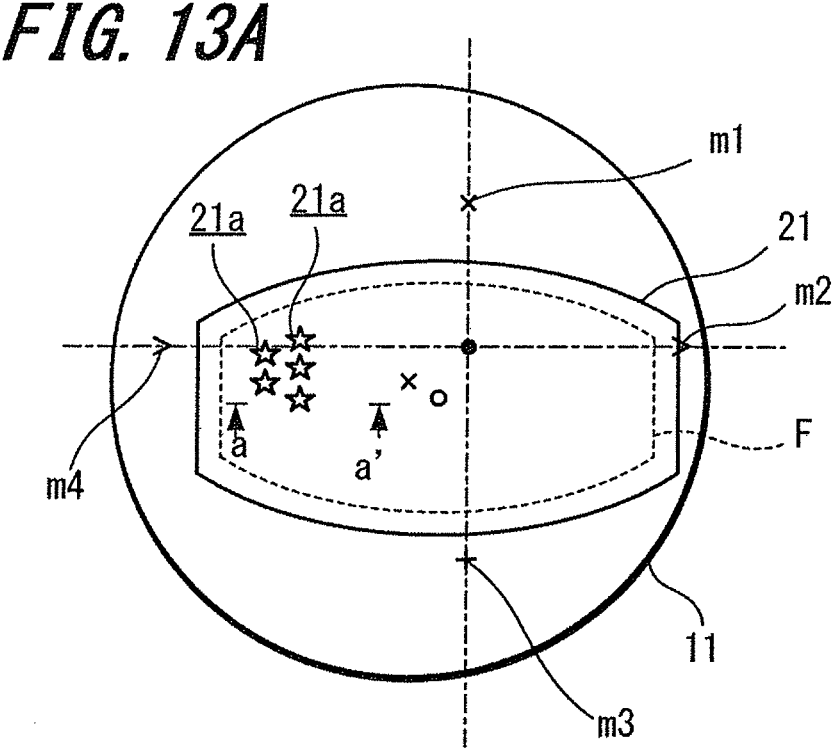
FIGS. 13A and 13B are producing process drawings (part one) showing the producing procedure of the optical lens according to the fourth embodiment.
Figure 13B:
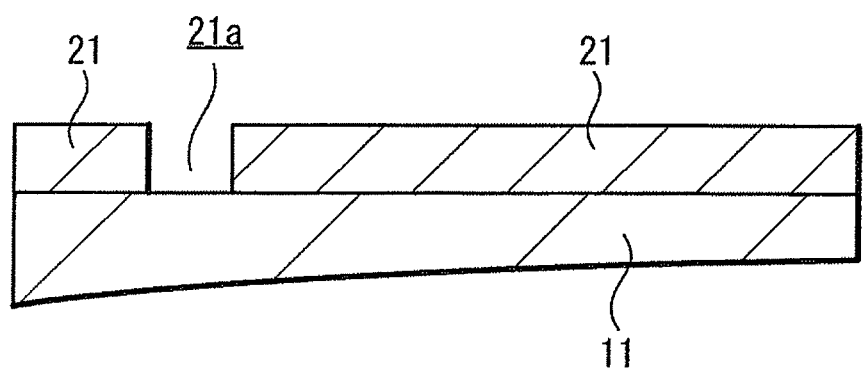

First, as shown in the plan view of FIG. 13A and the cross sectional view of FIG. 13B (equivalent to a cross section taken along line a-a' of FIG. 13A), the lens contour shape F of the lens substrate 11 is determined, and the reference marks m1 to m4 are formed on the side of the one principal surface of the lens substrate 11 (S21), wherein the reference marks m1 to m4 serve as a reference of the contour shape F. Such step is performed in the same manner as has been described in the first embodiment with reference to FIGS. 3A to 3C.

Next, a modification treatment is performed for the surface on the side of the one principal surface of the lens substrate 11 (S22). As the modification treatment, a treatment for ensuring wettability of the surface of the lens substrate 11 with respect to the ink to be used for forming the masking layer in the next step is performed. Here, as a treatment method that does not cause damage to the surface of the lens substrate 11, a plasma treatment using an oxygen plasma, for example, is performed. Incidentally, the modification treatment for ensuring wettability does not have to be limited to the plasma treatment, but may also be other methods as long as such methods do not caused damage to the lens substrate 11; for example, an ion irradiation treatment, a corona discharge treatment or the like may be performed as the modification treatment.

Next, regarding the lens substrate 11 having been subjected to the modification treatment as a base, an inkjet method is used to pattern-form the masking layer 21 on the surface of the base with the same step as has been described in the first embodiment (S23). Here, similar to the first embodiment, it is important to print and form the masking layer 21 by using an inkjet method so that the aperture pattern 21*a* is arranged at a predetermined position of the lens substrate 11 preset based on the previously-created reference marks m1 to m4, without being affected by the curve of the lens substrate 11.

[FIG. 14A]

Figure 14A:
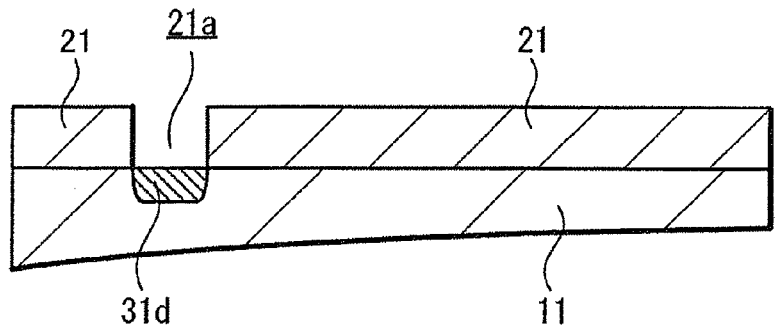
FIGS. 14A, 14B and 14C are producing process drawings (part two) showing the producing procedure of the optical lens according to the fourth embodiment.

Next, as shown in FIG. 14A, a dyeing process of the lens substrate 11 is performed from above the masking layer 21 (S24). By performing such step, a dyeing process is selectively performed with respect to the surface of the lens substrate 11 exposed from the bottom of the aperture pattern 21*a* of the masking layer 21. Here, a sublimation dyeing process, for example, is performed. In such a case, for example, a print sheet obtained by coating an ink on a substrate is prepared, wherein the ink is obtained by dispersing a sublimation dye into an aqueous medium. The print sheet is arranged so that the ink-coated surface of the print sheet faces the surface of the lens substrate 11 on which the masking layer 21 is to be formed, and the print sheet is heated in a predetermined reduced-pressure atmosphere. Thus, the sublimation dye of the print sheet is sublimated, so that the portion of the lens substrate 11 exposed from the bottom of the aperture pattern 21*a* of the masking layer 21 is dyed. At this time, the masking layer 21 is also dyed, but the portion of the lens substrate 11 covered by the masking layer 21 is not dyed. Consequently, the dyed pattern 31*d*, which is obtained by dyeing the surface layer of the lens substrate 11, is formed only in the bottom portion of the aperture pattern 21*a*. The dyed pattern 31*d* formed in such manner is formed at the same position and with the same shape as the aperture pattern 21*a* formed in the masking layer 21.

Here, the dyeing process is performed in a manner in which the depth d of the surface layer of the lens substrate 11 and the concentration of the dye constituting the dyed pattern 31*d* are controlled based on the required visibility of the dyed pattern 31*d*. The depth d and the concentration of the dye in the dyeing process are controlled for each material of the lens substrate 11 by adjusting the concentration of the dye of the print sheet and the processing time of the dyeing process.

Incidentally, in the case where a dipping method is used, the concentration can be controlled by adjusting the duration while the lens substrate 11 is dipped into a liquid dye, the temperature of the dye, and the like. Further, in the case where a dipping method is used, it is possible to dye both the concave surface and the convex surface, and it is also possible to control the contrasting density of the masking image by performing single-surface dyeing or both-surfaces dyeing.

[FIG. 14B]

Figure 14B:
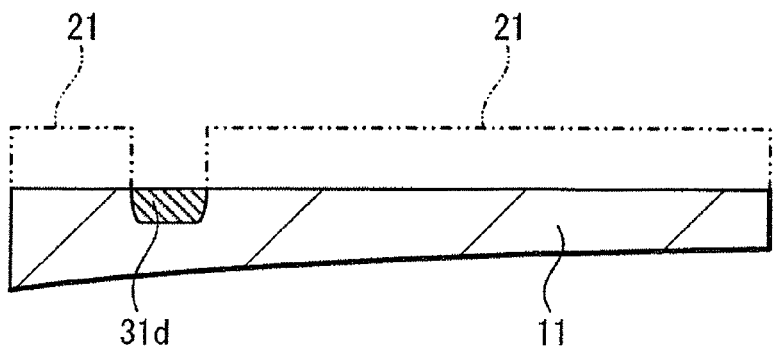

Next, as shown in FIG. 14B, a process for remove the masking layer 21 from the lens substrate 11 is performed (S25). Here, the dyed masking layer 21 is removed by performing, for example, a wet process using a solvent (ethanol, acetone or the like) that dissolves the masking layer 21.

[FIG. 14C]

Figure 14C:
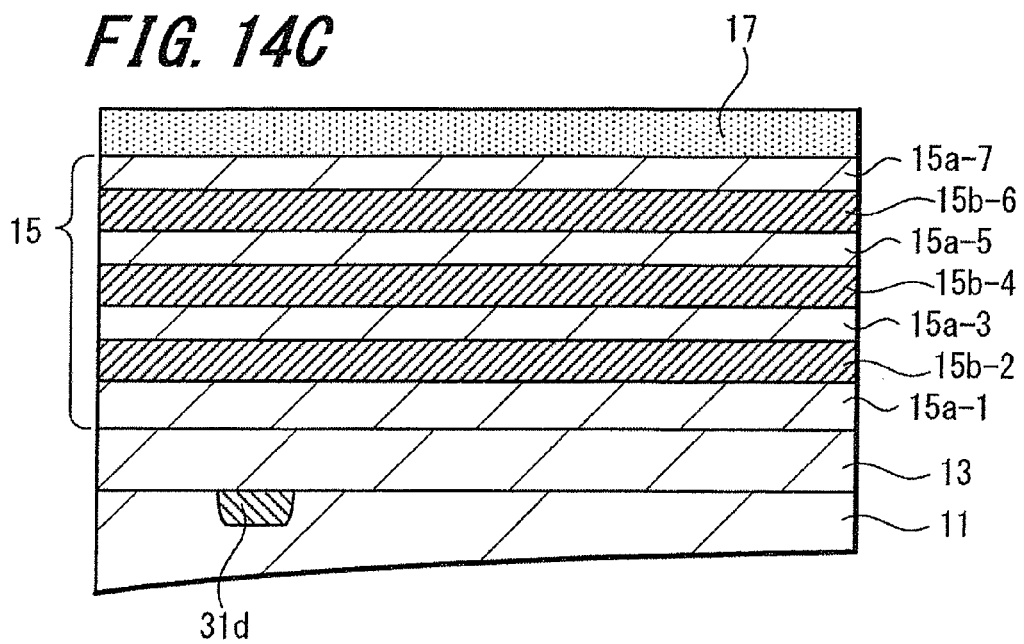

Next, as shown in FIG. 14C, the hard coat film 13 and the antireflection film 15 are formed in this order on the lens substrate 11 on which the dyed pattern 31*d* has been formed, and further, the water-repellent film 17 is formed on the antireflection film 15, wherein the antireflection film 15 has a multi-layer structure formed by alternately laminating the low refractive index film 15*a* and the high refractive index film 15*b* one upon another (S26). The antireflection film 15 is formed by performing ion assisted deposition to thereby form respective layers one upon another, with each composition and each film thickness, in the order from the low refractive index film 15*a*-1, which is arranged on the side of the underlying layer, to the low refractive index film 15*a*-7.

[FIG. 11A, FIG. 11B]

Thereafter, as shown in FIGS. 11A and 11B, the lens substrate 11, which has various layers up to the water-repellent film 17 formed thereon, is shape-cut to match the contour shape F determined with respect to the lens substrate 11 (S27). At this time, as shown in FIGS. 13A and 13B, similar to the process described in the first embodiment, the lens substrate 11 is shape-cut to match the contour shape F, which is aligned based on the reference marks m1 to m4 formed on the lens substrate 11, so that the optical lens 1*d* of the fourth embodiment is obtained.

<Advantages of Fourth Embodiment>

In the aforesaid method for producing the optical lens according to the fourth embodiment, as described with reference to FIG. 14A, by performing the dyeing process from above the masking layer 21, the dyed pattern 31*d*, as a processed pattern, is formed on the bottom of the aperture pattern 21*a* of the masking layer 21. In other words, the processed pattern can be formed as the dyed pattern 31*d* by performing a dyeing process. Further, the dyed pattern 31*d* (i.e., the processed pattern) is formed within the aperture pattern 21*a* of the masking layer 21. Thus, the dyed pattern 31*d* (i.e., the processed pattern) with high shape accuracy can be obtained following the forming accuracy of the masking layer 21 by the inkjet method. As a result, the dyed pattern 31*d*, as an ornamental pattern, logo, character or the like, can be formed as a processed pattern possible to be viewed from outside, at a predetermined position on the surface layer of the lens substrate 11.

5. Fifth Embodiment

Configuration of Optical Lens According to Fifth Embodiment

Figure 15A:
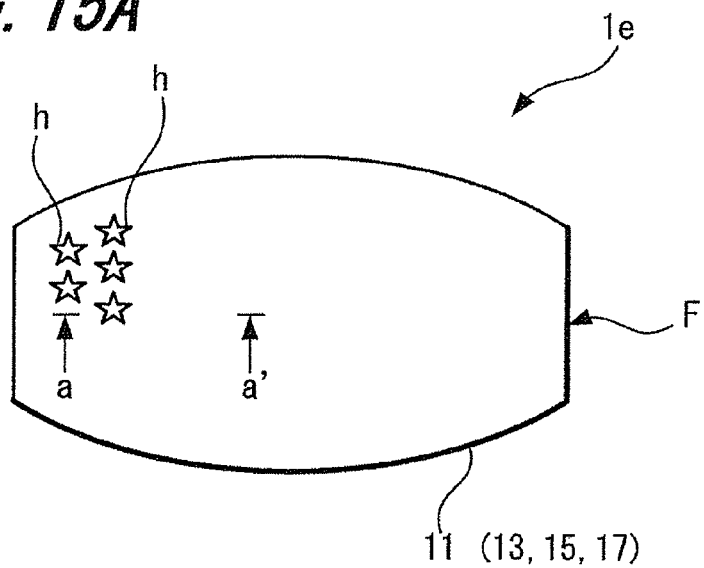
FIGS. 15A and 15B are respectively a plan view and a cross-sectional view showing the configuration of an optical lens produced by a method according to a fifth embodiment.
Figure 15B:
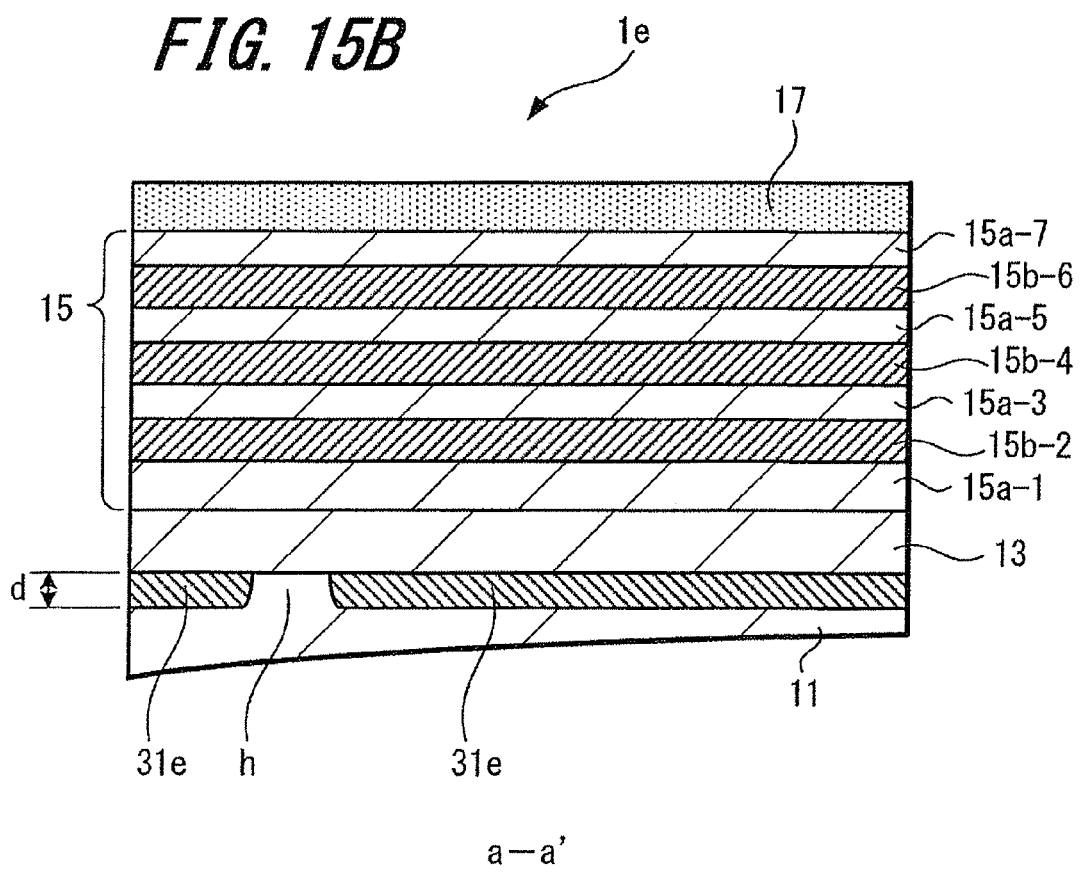

FIGS. 15A and 15B are views for explaining the configuration of an optical lens 1*e* according to a fifth embodiment, wherein FIG. 15A is a plan view, and FIG. 15B is a cross section taken along line a-a' of FIG. 15A. The optical lens 1*e* of the fifth embodiment shown in these drawings is identical to the optical lens (1*d*) of the fourth embodiment except that a dyed pattern 31*e* is configured as a punched pattern having an aperture h.

The dyed pattern 31*e* having the aperture h may have the same configuration as that of the island-like dyed pattern (31*d*) described in the fourth embodiment except for the planar shape. To be specific, the depth d of the dyed pattern 31*e* in the surface layer and the concentration of the dye of the dyed pattern 31*e* are suitably adjusted based on the required visibility of the dyed pattern 31*e* when viewed from the side of the water-repellent film 17. Particularly, it is preferred that the depth of the dyed pattern 31*e* and the concentration of the dye of the dyed pattern 31*e* are adjusted so that the dyed pattern 31*e* is not easily viewed in the case where the optical lens 1*e* is used to form a pair of spectacles and where the optical lens 1*e* is viewed at a very close distance from the side opposite the water-repellent film 17.

<Method for Producing Optical Lens of Fifth Embodiment>

The method for producing the optical lens 1*e* of the fifth embodiment having the aforesaid configuration is identical to that of the fourth embodiment. However, in the process for forming the masking layer 21 described with reference to FIGS. 13A and 13B, a masking layer having a reversed pattern may be formed by using an inkjet method.

<Advantages of Fifth Embodiment>

Since the same method as the fourth embodiment is applied to the fifth embodiment, the same advantages as the producing method of the fourth embodiment can be achieved by the fifth embodiment.

Although described in the aforesaid fourth embodiment and fifth embodiment is a configuration in which a dyeing pattern is formed on the surface layer on the side of the one principal surface of the lens substrate 11 from above the masking layer 21 by a sublimation dyeing method, the dyeing pattern does not have to be formed by a sublimation dyeing method, but may also be formed by other methods such as a dipping method, a transfer method, or the like.

However, as described in the fourth embodiment and fifth embodiment, in a state where the masking layer 21 is formed only on the side of the one principal surface of the lens substrate 11, if the dyeing process is performed using a method in which the entire lens substrate 11 is exposed to the dye, such as a dipping method, the other principal surface of the lens substrate 11 on which the masking layer 21 is not formed will be dyed. In such case, in order to form a dyeing pattern by performing dyeing process from the side of the masking layer 21, it is important to perform dyeing in a manner in which dyeing conditions are controlled so that the dye from the side of the other principal surface does not reach the side of the one principal surface on which the masking layer 21 has been formed. Alternatively, along with the side of the one principal surface of the lens substrate 11, the entire lens region on the side of the other principal surface may be covered by the masking layer, so that when performing dyeing process, the side of the other principal surface of the lens substrate 11 can be prevented from being dyed.

The aforesaid first to fifth embodiments are described based on an example in which the processed pattern is formed on a spectacle optical lens. However, the method for producing the optical lens according to the present invention can be widely used to form a processed pattern as an ornamental pattern, logo, character or the like in a predetermined lens region, instead of being limited to be used to produce a spectacle optical lens.

Further, the aforesaid first to fifth embodiments are described based on an example in which the masking layer 21 is formed using an inkjet method. However, the masking layer 21 does not have to be formed using the inkjet method, but may also be formed by printing or by attaching a tape. Even in such a case, by forming the masking layer 21 at accurate position in accurate shape, a transparent pattern or dyeing pattern configured by a transparent material film can be accurately formed on a lens surface, without limiting the material.

EXPLANATION OF REFERENCE NUMERALS

1*a*, 1*b*, 1*c*, 1*d*, 1e optical lens
11 lens substrate
F contour shape (lens region)
m1, m2, m3, m4 reference mark
21 masking layer
19, 29 transparent material film
19*a*, 19*b*, 29*c* transparent pattern (processed pattern)
31*d*, 31*e* dyed pattern (processed pattern)

The invention claimed is:

1. A method for producing an optical lens comprising the steps of:
    forming a mark outside a lens region set in a lens substrate, wherein the mark is adapted to perform position alignment;
    pattern-forming a masking layer above one principal surface of the lens substrate while directly controlling formation position of the masking layer to the lens substrate with the mark as a reference, wherein the masking layer has an aperture at a predetermined position in the lens region;
    performing a selective process with respect to a surface exposed from the bottom of the aperture of the masking layer by performing a process from above the masking layer;
    removing the masking layer from above the lens substrate to form a processed pattern by the selective process on the side of the one principal surface of the lens substrate; and
    forming a light transmissive material film above the processed pattern.

2. The method for producing the optical lens according to claim 1,
    wherein in the step of performing the selective process, a process for forming a transparent material film is performed, and
    wherein in the step of removing the masking layer, by removing the transparent material film formed on the masking layer along with the masking layer, a transparent pattern formed of the transparent material film, as the processed pattern, is formed only on the surface exposed from the bottom of the aperture of the masking layer.

3. The method for producing the optical lens according to claim 2, further comprising the step of:
    forming an antireflection film above the one principal surface of the lens substrate either between the time when the mark for performing position alignment has been formed and the time when the masking layer is pattern-formed or after the time when the processed pattern has been formed.

4. The method for producing the optical lens according to claim 1, wherein in the step of performing the selective process, by performing a dyeing process with respect to bottom of the aperture of the masking layer, a dyeing pattern is formed as the processed pattern.

5. The method for producing the optical lens according to claim 4, further comprising the step of:
    forming an antireflection film above the one principal surface of the lens substrate after the dyeing pattern has been formed as the processed pattern.

6. The method for producing the optical lens according to claim 1, further comprising the step of:
    performing a modification treatment with respect to the surface of a base of the masking layer before the step of forming the masking layer, wherein the modification treatment is adapted to ensure wettability of the base with respect to an ink constituting the masking layer.

7. The method for producing the optical lens according to claim 1, further comprising the step of:
    cutting out the lens region from the lens substrate on which the processed pattern has been formed.

8. The method for producing the optical lens according to claim 1, wherein in the step of pattern-forming the masking layer, the pattern-forming is performed by an inkjet method.

9. The method for producing the optical lens according to claim 1, wherein in the step of forming the light transmissive material film, the film is formed in a state where the processed pattern and surroundings thereof are covered.

10. The method for producing the optical lens according to claim 1, wherein the step of forming the mark for performing position alignment comprises the steps of:
    setting optical coordinates on the one principal surface of the lens substrate based on an optical center and a geometric center of the lens substrate;
    detecting the center of a contour shape of the lens region based on data of the contour shape and the optical coordinates;
    determining, on the one principal surface of the lens substrate, the contour shape of the lens region based on the center of the contour shape and the optical center; and
    forming, on the outside of the contour shape determined on the one principal surface of the lens substrate, the mark for performing position alignment based on the optical coordinates.

* * * * *